(12) United States Patent
Cabioch et al.

(10) Patent No.: US 11,865,866 B2
(45) Date of Patent: Jan. 9, 2024

(54) TREAD FOR AN AIRCRAFT TIRE (71) Applicant: COMPAGNIE GENERALE DES ETABLISSEMENTS MICHELIN, Clermont-Ferrand (FR)

(72) Inventors: Jean-Luc Cabioch, Clermont-Ferrand (FR); Michael Arnoux, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 294 days.

(21) Appl. No.: 17/299,475

(22) PCT Filed: Dec. 2, 2019

(86) PCT No.: PCT/FR2019/052881
§ 371 (c)(1),
(2) Date: Jun. 3, 2021

(87) PCT Pub. No.: WO2020/115412
PCT Pub. Date: Jun. 11, 2020

(65) Prior Publication Data
US 2022/0048329 A1    Feb. 17, 2022

(30) Foreign Application Priority Data

Dec. 4, 2018  (FR) ...................................... 1872317

(51) Int. Cl.
| C08L 9/06 | (2006.01) |
| C08L 15/00 | (2006.01) |
| C08K 3/04 | (2006.01) |
| B60C 1/00 | (2006.01) |
| B60C 11/00 | (2006.01) |
| C08C 19/42 | (2006.01) |
| C08L 45/00 | (2006.01) |

(52) U.S. Cl.
CPC ........ B60C 11/0058 (2013.01); B60C 1/0016 (2013.01); C08K 3/04 (2013.01); C08L 9/06 (2013.01); C08L 15/00 (2013.01); B60C 2200/02 (2013.01); C08C 19/42 (2013.01); C08L 45/00 (2013.01)

(58) Field of Classification Search
CPC .. B60C 11/00; B60C 1/00; C08K 3/04; C08L 15/00; C08L 9/06
USPC ........................................................ 523/156
See application file for complete search history.

(56) References Cited

U.S. PATENT DOCUMENTS

| 5,227,425 A | 7/1993 | Rauline |
| 5,852,099 A | 12/1998 | Vanel |
| 5,900,449 A | 5/1999 | Custodero et al. |
| 6,420,488 B1 | 7/2002 | Penot |
| 6,536,492 B2 | 3/2003 | Vasseur |
| 6,601,626 B2 | 8/2003 | Royer et al. |
| 6,774,255 B1 | 8/2004 | Tardivat et al. |
| 6,849,754 B2 | 2/2005 | Deschler et al. |
| 7,199,175 B2 | 4/2007 | Vasseur |
| 7,217,751 B2 | 5/2007 | Durel et al. |
| 7,250,463 B2 | 7/2007 | Durel et al. |
| 7,488,768 B2 | 2/2009 | Tardivat et al. |
| 7,712,499 B2 | 5/2010 | Yano et al. |
| 7,820,771 B2 | 10/2010 | Apra et al. |
| 7,905,265 B2 | 3/2011 | Roget et al. |
| 8,461,269 B2 | 6/2013 | Varagniat et al. |
| 8,492,475 B2 | 7/2013 | Araujo Da Silva et al. |
| 8,883,929 B2 | 11/2014 | Gandon-Pain et al. |
| 8,957,155 B2 | 2/2015 | Seeboth et al. |
| 9,010,393 B2 | 4/2015 | Araujo Da Silva et al. |
| 9,670,291 B2 | 6/2017 | Marechal et al. |
| 11,090,980 B2 | 8/2021 | Joulin et al. |
| 11,225,567 B2 | 1/2022 | Cabioch et al. |
| 2001/0034389 A1 | 10/2001 | Vasseur |
| 2002/0005239 A1 | 1/2002 | Royer et al. |
| 2003/0212185 A1 | 11/2003 | Vasseur |
| 2004/0051210 A1 | 3/2004 | Tardivat et al. |
| 2004/0132880 A1 | 7/2004 | Durel et al. |
| 2004/0206439 A1 | 10/2004 | Roget et al. |
| 2005/0004297 A1 | 1/2005 | Durel et al. |
| 2005/0194081 A1 | 9/2005 | Yano et al. |

(Continued)

FOREIGN PATENT DOCUMENTS

| CN | 106232703 A | 12/2016 |
| CN | 108463360 A | 8/2018 |

(Continued)

OTHER PUBLICATIONS

International Search Report dated Mar. 30, 2020, in corresponding PCT/FR2019/052881 (4 pages).

(Continued)

*Primary Examiner* — Deve V Hall
(74) *Attorney, Agent, or Firm* — VENABLE LLP (57) ABSTRACT

An aircraft tire comprises a tread (2), having an axial width L, which comprises a middle portion (3) having an axial width $L_C$ at least equal to 50% and at most equal to 80% of the axial width L of the tread and consisting of a middle rubber composition, and two lateral portions (41, 42), positioned axially on either side of the middle portion (3), each having an axial width ($L_{S1}$, $L_{S2}$) at least equal to 10% and at most equal to 25% of the axial width L of the tread and each consisting of a lateral rubber composition. The middle rubber composition comprises in particular from 25 to 85 phr of a tin-functionalized butadiene and styrene copolymer and from 15 to 75 phr of isoprene elastomer, and at least one lateral rubber composition is different from the middle rubber composition.

14 Claims, 2 Drawing Sheets

(56) References Cited

U.S. PATENT DOCUMENTS

| | | | |
|---|---|---|---|
| 2005/0197442 A1* | 9/2005 | Jones | C08L 23/283 524/495 |
| 2007/0112120 A1 | 5/2007 | Vasseur | |
| 2007/0235116 A1 | 10/2007 | Roget et al. | |
| 2008/0132644 A1 | 6/2008 | Lapra et al. | |
| 2009/0186961 A1 | 7/2009 | Araujo Da Silva et al. | |
| 2009/0209709 A1 | 8/2009 | Araujo Da Silva et al. | |
| 2009/0234066 A1 | 9/2009 | Araujo Da Silva et al. | |
| 2009/0270558 A1 | 10/2009 | Gandon-pain et al. | |
| 2010/0022714 A1 | 1/2010 | Varagniat et al. | |
| 2010/0145089 A1 | 6/2010 | Mignani et al. | |
| 2011/0021702 A1 | 1/2011 | Gandon-Pain et al. | |
| 2011/0152458 A1 | 6/2011 | Araujo Da Silva et al. | |
| 2011/0214788 A1 | 9/2011 | Chambriard et al. | |
| 2011/0294953 A1 | 12/2011 | Seeboth et al. | |
| 2012/0208948 A1 | 8/2012 | Gandon-Pain et al. | |
| 2012/0252928 A1 | 10/2012 | Marechal et al. | |
| 2017/0121509 A1 | 5/2017 | Belin et al. | |
| 2018/0215905 A1* | 8/2018 | Mangeret | C08K 3/22 |
| 2018/0326789 A1* | 11/2018 | Joulin | B60C 11/00 |
| 2020/0385550 A1 | 12/2020 | Cabioch et al. | |

FOREIGN PATENT DOCUMENTS

| | | | | |
|---|---|---|---|---|
| EP | 0501227 | A1 | 9/1992 | |
| EP | 0735088 | A1 | 10/1996 | |
| EP | 0810258 | A1 | 12/1997 | |
| EP | 1163120 | | 9/2000 | |
| EP | 1381525 | | 10/2002 | |
| EP | 1477333 | A1 | 11/2004 | |
| EP | 2310213 | | 1/2010 | |
| WO | 97/36724 | A2 | 10/1997 | |
| WO | 99/09036 | A1 | 2/1999 | |
| WO | 99/16600 | A1 | 4/1999 | |
| WO | 00/05300 | A1 | 2/2000 | |
| WO | 00/05301 | A1 | 2/2000 | |
| WO | 02/10269 | A2 | 2/2002 | |
| WO | 02/30939 | A1 | 4/2002 | |
| WO | 02/31041 | A1 | 4/2002 | |
| WO | 02/083782 | A1 | 10/2002 | |
| WO | 03/016387 | A1 | 2/2003 | |
| WO | 2006/023815 | A2 | 3/2006 | |
| WO | 2006/069792 | A1 | 7/2006 | |
| WO | 2006/069793 | A1 | 7/2006 | |
| WO | 2006/125532 | A1 | 11/2006 | |
| WO | 2006/125533 | A1 | 11/2006 | |
| WO | 2006/125534 | A1 | 11/2006 | |
| WO | 2007/061550 | A1 | 5/2007 | |
| WO | 2007/098080 | A2 | 8/2007 | |
| WO | 2008/003434 | A1 | 1/2008 | |
| WO | 2008/003435 | A1 | 1/2008 | |
| WO | 2008/055986 | A2 | 5/2008 | |
| WO | 2010/072685 | A1 | 7/2010 | |
| WO | 2011/042507 | A1 | 4/2011 | |
| WO | 2017/017123 | A1 | 2/2017 | |
| WO | WO-2017017123 A1 * | | 2/2017 | ........... B60C 1/0016 |
| WO | WO-2017085423 A1 * | | 5/2017 | ............... B60C 1/00 |

OTHER PUBLICATIONS

S. Brunauer, et al., "Adsorption of Gases in Multimolecular Layers", J. Am. Chem. Soc., vol. 60, pp. 309-319 (1938).

R. Mildenberg, et al., Hydrocarbon Resins, VCH, New York, chapter 5, pp. 141-146 (1997).

S.K. Clark, "Touchdown Dynamics", Precision Measurement Co., Ann Arbor, MI, NASA, 35 Langley Research Center, Computational Modeling of Tires, pp. 9-19 (1995).

* cited by examiner

TREAD FOR AN AIRCRAFT TIRE

BACKGROUND

The subject of the present invention is an aircraft tyre and, in particular, the tread of an aircraft tyre.

An aircraft tyre is characterized by use at high pressure, load and speed. By way of example, an aircraft tyre of dimension 46×17R20, intended to be fitted to a commercial aircraft, may be used at a pressure equal to 15.3 bar, a static load equal to 21 tonnes and a maximum speed equal to 360 km/h. Generally, an aircraft tyre is used at a pressure of greater than 9 bar and a degree of deflection at least equal to 32%. The use pressure is defined, for example, by the Tire and Rim Association (TRA) standard. The degree of deflection of a tyre is, by definition, its radial deformation, or its variation in radial height, when the tyre changes from an unladen inflated state to a statically loaded inflated state, under pressure and load conditions recommended, for example, by the TRA standard. It is expressed in the form of a relative deflection, defined by the ratio of this variation in radial height of the tyre to half the difference between the outside diameter of the tyre and the maximum diameter of the rim measured on the rim flange. The outside diameter of the tyre is measured under static conditions in an unladen state inflated to the recommended pressure.

Since a tyre has a geometry exhibiting symmetry of revolution about an axis of rotation, the geometry of the tyre is generally described in a meridian plane containing the axis of rotation of the tyre. For a given meridian plane, the radial, axial and circumferential directions denote the directions perpendicular to the axis of rotation of the tyre, parallel to the axis of rotation of the tyre and perpendicular to the meridian plane, respectively. The expressions "radially", "axially" and "circumferentially" mean "in the radial direction", "in the axial direction" and "in the circumferential direction", respectively.

The tread is the portion of the tyre intended to come into contact with the ground via a tread surface, and extending radially from a bottom surface to the tread surface, axially from a first tread edge to a second tread edge defining the axial width of the tread, and circumferentially over the whole periphery of the tyre. Conventionally, the axial width of the tread is defined as the width of the patch of contact between the tread and the ground, measured along the axial straight line passing through the centre of the contact patch, when the new tyre is subject to the loading and pressure conditions recommended by the TRA standard. The tread generally consists of raised elements separated by voids. In the case of an aircraft tyre, the raised elements are usually circumferential ribs, continuous over the whole circumference of the tyre, and separated by circumferential voids or furrows. The tread, which is the wearing portion of the tyre, comprises at least one rubber composition, usually based on natural rubber and on carbon black, these two main elements affording the rubber composition the mechanical properties necessary for the wear conditions of an aircraft tyre. In addition to these main elements, such a rubber composition conventionally comprises a vulcanization system and protective agents.

Radially inside the tread, a radial-type tyre comprises a reinforcement, consisting of a crown reinforcement and a radial carcass reinforcement radially inside the crown reinforcement. The crown reinforcement comprises at least one crown layer consisting of reinforcing elements or reinforcers coated with an elastomeric mixture and parallel to one another. The radial carcass reinforcement comprises at least one carcass layer consisting of reinforcers coated with an elastomeric mixture, parallel to one another and oriented substantially radially, that is to say forming, with the circumferential direction, an angle of between 85° and 95°. The reinforcers of the crown and carcass layers, for aircraft tyres, are usually textile reinforcers made of aliphatic polyamide such as nylon, made of aromatic polyamide such as aramid, or made of hybrid material combining, for example, an aliphatic polyamide and an aromatic polyamide.

In aircraft tyres, the presence of non-uniform wear to the tread, known as irregular wear, has been observed, resulting from the stresses that occur during the various life phases of the tyre: take-off, taxiing and landing. Differential wear to the tread between a middle portion and the two lateral portions of the tread, axially on the outside of the middle portion, has more particularly been demonstrated, with the wear to this middle portion being greater. The differential wear to the middle portion of the tread leads to a limiting of the service life of the tyre, and therefore to a limiting of its use and to the premature removal thereof, despite the fact that the tread generally only has a relatively small degree of wear to the lateral portions of the tread: this is economically unsound.

Those skilled in the art have demonstrated two types of wear, depending on the life phase of the tyre. On landing, the middle portion of the tread, having an axial width at least equal to 50% and at most equal to 80% of the total axial width of the tread, and coming into contact with the ground, is subject to wear referred to as "touch wear", resulting from significant thermal heating at the moment at which the tread surface enters into contact with the ground, due to the speed differential between the speed of rotation of the tyre and the speed of the aircraft. In the taxiing phase, before take-off or after landing, the lateral portions of the tread, positioned axially on either side of the middle portion and each having an axial width at least equal to 10% and at most equal to 25% of the total axial width of the tread, are subject to wear referred to as "taxiing wear", resulting from the braking forces exerted on these lateral portions due to their speed of rotation, which is higher than that of the middle portion. Thus, the tread is mainly worn in its middle portion on landing and in its lateral portions on taxiing.

In order to solve the problem of irregular wear specific to aircraft tyres, those skilled in the art sought, according to a first approach, to optimize the inflated meridian profile of the tread surface, this meridian profile being the meridian cross section through the tread surface of an unladen new tyre inflated to its nominal pressure, without taking into account circumferential grooves. Optimizing this inflated meridian profile, i.e. the geometric form thereof, makes it possible to optimize the geometric form of the contact surface of the tyre with the ground and, consequently, the distribution of the mechanical stresses within this contact surface and hence to act on the wear of the tread. For example, documents EP 1163120, EP 1381525, EP 1477333 and EP 2310213 describe solutions aiming to optimize the inflated profile of the tread surface by acting on the tensile stiffnesses of the crown and/or carcass layers, or on the tensile stiffness differentials between the middle portion and the lateral portions of the crown layers, or else on an optimized crown layer profile with a concave middle portion. All these solutions are based on changes in the material and/or geometry of the crown layers.

Another approach to the wear of an aircraft tyre is optimizing the rubber composition(s) composing the tread. Indeed, wear also depends on the rubber composition(s) composing the tread and on their sensitivity to abrasion, characterized in particular by their cohesion, since cohesion depends on the chemical composition.

SUMMARY

The inventors set themselves the goal, in relation to an aircraft tyre of the prior art, of increasing the resistance to touch wear of the middle portion of the tread during landing phases, while retaining the same level of resistance to taxiing wear of the lateral portions of the tread during taxiing phases, by acting on the rubber composition(s) of the various portions of the tread.

This goal has been achieved, according to the invention, by an aircraft tyre comprising a tread having an axial width L, the tread comprising:
- a middle portion having an axial width LC at least equal to 50% and at most equal to 80% of the axial width L of the tread and consisting of a middle rubber composition, and
- two lateral portions positioned axially on either side of the middle portion, each having an axial width at least equal to 10% and at most equal to 25% of the axial width L of the tread and each consisting of a lateral rubber composition, in which the middle rubber composition comprises at least one elastomeric matrix, a reinforcing filler and a crosslinking system, said elastomeric matrix comprising from 25 to 85 phr of a tin-functionalized butadiene and styrene copolymer and from 15 to 75 phr of isoprene elastomer, the total content of isoprene elastomer and of tin-functionalized butadiene and styrene copolymer in the middle rubber composition being within a range extending from 45 to 100 phr, and in which at least one lateral rubber composition is different from the middle rubber composition.

I—Definitions

The expression "composition based on" should be understood as meaning a composition comprising the mixture and/or the product of the in situ reaction of the various constituents used, some of these constituents being able to react and/or being intended to react with one another, at least partially, during the various phases of manufacture of the composition; it thus being possible for the composition to be in the completely or partially crosslinked state or in the noncrosslinked state.

For the purposes of the present invention, the expression "part by weight per hundred parts by weight of elastomer" (or phr) should be understood as meaning the part by mass per hundred parts by mass of elastomer.

In the present document, unless expressly indicated otherwise, all the percentages (%) indicated are percentages (%) by weight.

Furthermore, any interval of values denoted by the expression "between a and b" represents the range of values extending from more than a to less than b (that is to say, limits a and b excluded), while any interval of values denoted by the expression "from a to b" means the range of values extending from a up to b (that is to say, including the strict limits a and b). In the present document, when an interval of values is described by the expression "from a to b", the interval represented by the expression "between a and b" is also and preferably described.

When reference is made to a "predominant" compound, this is understood to mean, for the purposes of the present invention, that this compound is predominant among the compounds of the same type in the composition, that is to say that it is the one which represents the greatest amount by weight among the compounds of the same type. Thus, for example, a predominant elastomer is the elastomer representing the greatest weight with respect to the total weight of the elastomers in the composition. In the same way, a "predominant" filler is that representing the greatest weight among the fillers of the composition. By way of example, in a system comprising just one elastomer, the latter is predominant for the purposes of the present invention and, in a system comprising two elastomers, the predominant elastomer represents more than half of the weight of the elastomers. Preferably, the term "predominant" is understood to mean present at more than 50%, preferably more than 60%, 70%, 80%, 90%, and more preferentially the "predominant" compound represents 100%.

The compounds comprising carbon mentioned in the description may be of fossil or biobased origin. In the latter case, they may be partially or completely derived from biomass or may be obtained from renewable starting materials derived from biomass. Polymers, plasticizers, fillers, etc. are notably concerned.

All the values for glass transition temperature "Tg" described in the present document are measured in a known way by DSC (Differential Scanning Calorimetry) according to Standard ASTM D3418 (1999).

II—DESCRIPTION OF THE INVENTION

II-I Tread and Tyre

The aircraft tyre according to the invention comprises a tread having an axial width L, the tread comprising:
- a middle portion having an axial width LC at least equal to 50% and at most equal to 80% of the axial width L of the tread and consisting of a middle rubber composition, and
- two lateral portions positioned axially on either side of the middle portion, each having an axial width at least equal to 10% and at most equal to 25% of the axial width L of the tread and each consisting of a lateral rubber composition.

It should be noted that the lateral portions of the tread can have different axial widths and/or have different lateral rubber compositions.

Figure 1:
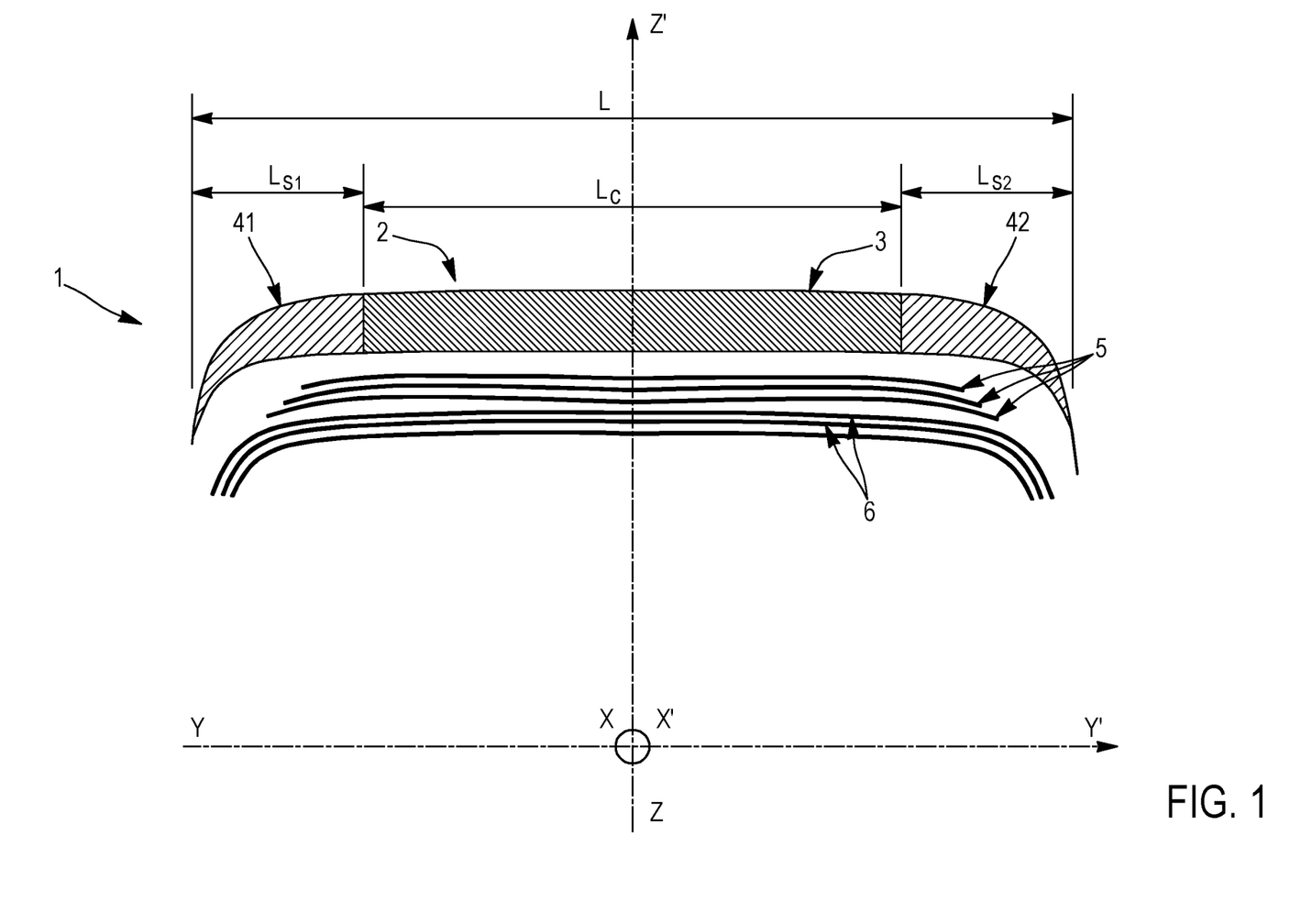
FIG. 1, not shown to scale in order to facilitate the understanding thereof, presents a view in cross section in a meridian plane of the crown of an aircraft tyre according to the invention, comprising, radially from the outside to the inside, a tread 2, a crown reinforcement 5 and a carcass reinforcement 6. The tread 2, having an axial width L, comprises a middle portion 3 having an axial width $L_C$ at least equal to 50% and at most equal to 80% of the axial width L of the tread and consisting of a middle rubber composition, and two lateral portions 41, 42, positioned axially on either side of the middle portion 3, each having an axial width ($L_{S1}$, $L_{S2}$) at least equal to 10% and at most equal to 25% of the axial width L of the tread and each consisting of a lateral rubber composition.

Preferably, the two lateral portions 41, 42, positioned axially on either side of the middle portion 3, are different from the middle rubber composition. Advantageously, the two lateral portions 41, 42, positioned axially on either side of the middle portion 3, consist of identical lateral rubber compositions and/or have identical axial widths ($L_{S1}$, $L_{S2}$).

Figure 2:
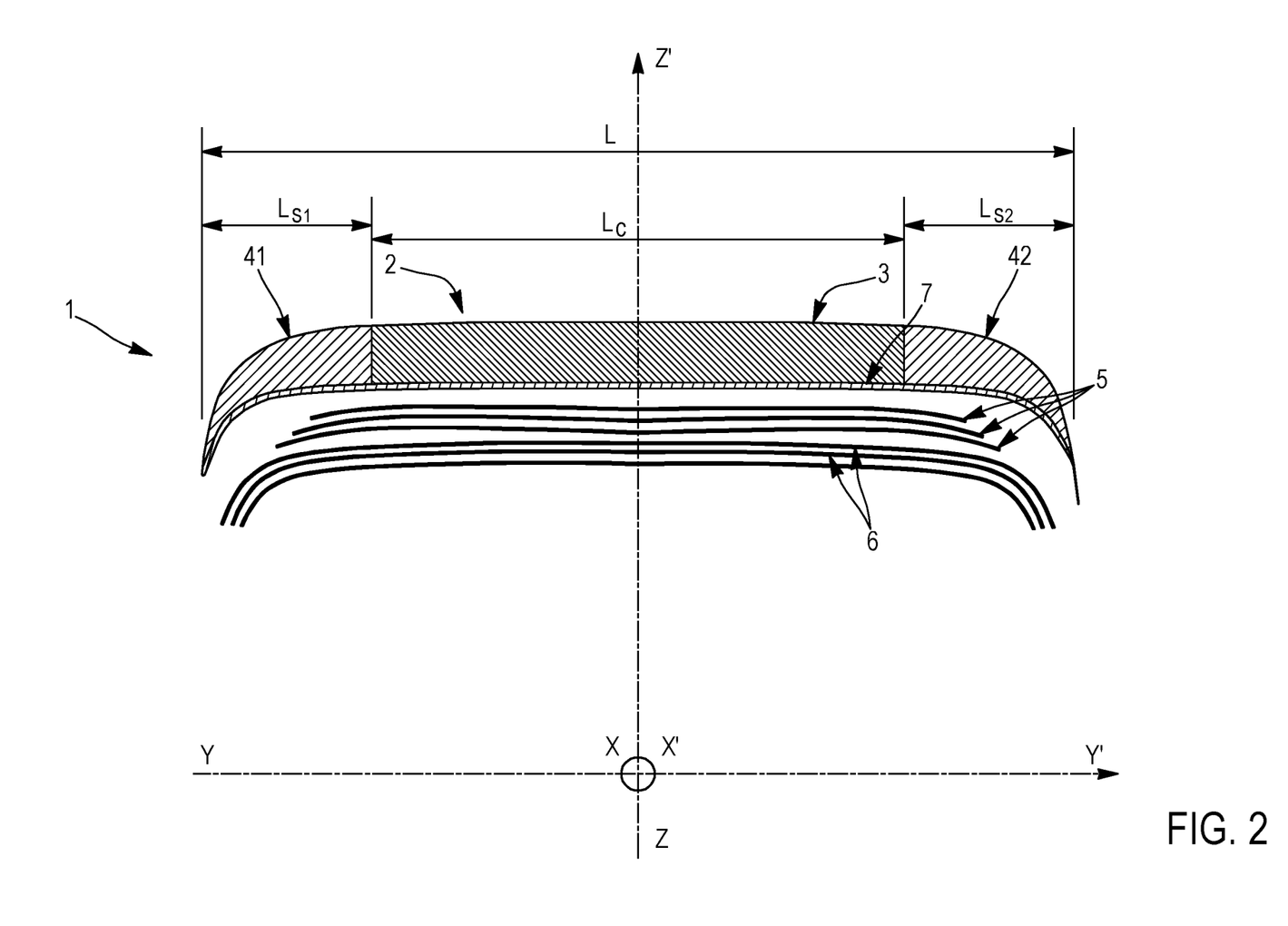
FIG. 2 presents a view in cross section in a meridian plane of the crown of an aircraft tyre according to a particular embodiment of the invention, in which the tyre 1 also comprises an interlayer 7 consisting of a rubber composition, in contact by a radially outer face with the tread 2 and by a radially inner face with the crown reinforcement 5.

The tyre according to the invention can advantageously comprise an interlayer 7 consisting of a rubber composition in contact, via a radially outer face, with at least the middle portion 3 of the tread 2 and, via a radially inner face, with the crown reinforcement 5. Contact of the radially outer face of the interlayer with at least the middle portion of the tread means that the axial width of this contact is at least equal to the axial width $L_C$ of the middle portion of the tread. Contact of the radially inner face of the interlayer with the crown reinforcement is contact with the protective reinforcement, which is the radially outermost portion of the crown reinforcement, intended to protect the working reinforcement, which is the radially innermost portion of the crown reinforcement. This interlayer, also referred to as connecting layer, guarantees better connection between the tread comprising a rubber composition according to the invention and the crown reinforcement.

The carcass reinforcement of an aircraft tyre generally comprises a carcass reinforcement 6 consisting of a plurality of carcass layers extending between the two beads and distributed between a first and a second family.

The first family consists of carcass layers which are wound, in each bead, from the inside towards the outside of the tyre, around a circumferential reinforcing element, known as a bead wire, in order to form a turn-up, the end of which is generally radially on the outside of the radially outermost point of the bead wire. The turn-up is the carcass layer portion between the radially innermost point of the carcass layer and its end. The carcass layers of the first family are the carcass layers closest to the internal cavity of the tyre and thus the axially innermost, in the sidewalls.

The second family consists of carcass layers which extend, in each bead, from the outside towards the inside of the tyre, as far as an end which is generally radially on the inside of the radially outermost point of the bead wire. The carcass layers of the second family are the carcass layers closest to the outer surface of the tyre and thus the axially outermost, in the sidewalls.

Usually, the carcass layers of the second family are positioned, over their entire length, on the outside of the carcass layers of the first family, that is to say that they cover, in particular, the turn-ups of the carcass layers of the first family. Each carcass layer of the first and of the second family consists of reinforcing elements which are parallel to each other, forming, with the circumferential direction, an angle of between 80° and 100°.

The reinforcing elements of the carcass layers of an aircraft tyre are generally cords consisting of spun yarns of textile filaments, preferably made of aliphatic polyamide or of aromatic polyamide, and characterized by their mechanical properties in extension. The textile reinforcing elements are subjected to tension over an initial length of 400 mm at a nominal rate of 200 mm/min. All the results are a mean of 10 measurements.

The tyre according to the invention can comprise a number of carcass layers ranging from 2 to 12, preferably from 5 to 10.

The tyres according to the present invention may be used on any type of aircraft. They are particularly advantageous for aircraft using large-sized tyres. This is because the greater the size of an aircraft tyre, the greater will be the impact of the wear on landing on the overall wear of the tyre. Thus, according to the invention, the tyre may have a size of greater than 18 inches, preferably of 20 to 23 inches.

II-2 Middle Rubber Composition

II-2-a Elastomeric Matrix

According to the invention, the elastomeric matrix of the middle rubber composition comprises from 25 to 85 parts by weight per hundred parts by weight of elastomer, phr, of a tin-functionalized butadiene and styrene copolymer and from 15 to 75 phr of isoprene elastomer, the total content of isoprene elastomer and of tin-functionalized butadiene and styrene copolymer in the middle rubber composition being within a range extending from to 100 phr.

The term "isoprene elastomer" is understood to mean, in a known way, an isoprene homopolymer or copolymer, in other words a diene elastomer selected from the group consisting of natural rubber (NR), synthetic polyisoprenes (IRs), the various isoprene copolymers and the mixtures of these elastomers. Mention will in particular be made, among isoprene copolymers, of isobutene/isoprene (butyl rubber—IIR), isoprene/styrene (SIR), isoprene/butadiene (BIR) or isoprene/butadiene/styrene (SBIR) copolymers. This isoprene elastomer is preferably natural rubber or a synthetic cis-1,4-polyisoprene, preferably natural rubber. For example, the synthetic polyisoprene may be a polyisoprene having a content (mol %) of cis-1,4-bonds of greater than 90%, even more preferentially of greater than 98%.

The elastomers used in the context of the present invention may be, for example, block, random, sequential or microsequential elastomers and may be prepared in dispersion or in solution; they may be coupled and/or star-branched and/or functionalized with a coupling and/or star-branching and/or functionalization agent.

Preferably, according to the invention, the content of isoprene elastomer can be within a range extending from 20 to 70 phr, preferably from 20 to 65 or from 30 to 65 phr, preferably from 25 to 60 phr, preferably from 25 to 50 phr.

The isoprene elastomer may be selected from the group comprising natural rubber, synthetic polyisoprene and a mixture thereof. Preferably, the isoprene elastomer is natural rubber.

For the purposes of the present invention, copolymer of butadiene units and of styrene units refers to any copolymer obtained by copolymerization of one or more butadiene(s) with one or more styrene compounds. The following, for example, are suitable as styrene compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene. These elastomers can have any microstructure, which depends on the polymerization conditions used, in particular on the presence or absence of a modifying and/or randomizing agent and on the amounts of modifying and/or randomizing agent employed. The elastomers may be, for example, block, random, sequential or microsequential elastomers and may be prepared in dispersion or in solution.

The tin(Sn)-functionalized butadiene and styrene copolymer, that is to say comprising C—Sn bonds (also known as Sn functionalization), can be functionalized singly (C—Sn bonds at the chain end) and/or coupled (Sn atom between two chains) and/or star-branched (Sn atom between 3 or more chains) with a functionalization and/or coupling and/or star-branching agent. Generically, in order to bring together all these elastomers bonded to tin, the term "tin-functionalized elastomers" is used. These elastomers are known to those skilled in the art, for example the ones described in WO 2011/042507.

Other types of functionalization exist for styrene and butadiene copolymers, such as silanol or polysiloxane functional groups having a silanol end, or else epoxidized styrene and butadiene copolymers. Such functionalizations are possible in the context of the present invention, in addition to that with tin.

Those skilled in the art well know the functionalization and/or coupling and/or star-branching agents that may be used in the context of the present invention. As examples of functionalization agent, mention may be made of the tin-derived functionalization agents which may correspond to the general formula $(X^1{}_1R^1{}_2Sn)$—O—$(SnR^1{}_{3-y}X^1{}_y)$ or $(X^1{}_1R^1{}_2Sn)$—O—$(CH_2)_n$—O—$(SnR^1{}_{3-y}X^1{}_y)$, where y represents an integer having the value 0 or 1, $R^1$ represents an alkyl, cycloalkyl, aryl, alkaryl or vinyl radical containing from 1 to 12 carbon atoms, preferably a butyl, $X^1$ is a halogen atom, preferably chlorine, and n represents an integer from 1 to 20, preferably 4. Furthermore, as tin-comprising coupling or star-branching agents, mention may be made of the tin derivatives of formula $SnR_xX_{4-x}$, x representing an integer having a value from 0 to 2, R representing an alkyl, cycloalkyl, aryl, alkaryl, aralkyl or vinyl radical containing from 1 to 10 carbon atoms, preferably an alkyl radical having from 1 to 4 carbon atoms, and X is a halogen atom, preferably chlorine. Preferential tin derivatives that may be mentioned include dibutyltin dichloride and tin tetrachloride, the latter being most particularly preferred.

The tin-functionalized butadiene and styrene copolymer can be obtained in a way known per se by reaction of a tin derivative with the butadiene and styrene copolymer. The preparation of a star-branched diene elastomer is described, for example, in patent U.S. Pat. No. 3,393,182.

The tin-functionalized butadiene and styrene copolymer is preferably a random butadiene/styrene copolymer (SBR). Reference will then be made to tin-functionalized SBR (Sn-SBR). It may be, for example, an SBR prepared in emulsion ("ESBR") or an SBR prepared in solution ("SSBR"). Advantageously, the tin-functionalized butadiene and styrene copolymer is a random butadiene/styrene copolymer prepared in solution (SSBR). The contents of vinyl (1,2-), trans-1,4- and cis-1,4-bonds of the butadiene portion of the SBR may be variable. For example, the vinyl content may be between 15% and 80% (mol %) and the content of trans-1,4-bonds between 15% and 80% (mol %).

Preferably, the tin-functionalized butadiene and styrene copolymer is a tin-functionalized butadiene and styrene copolymer comprising a low styrene content. The styrene content of the tin-functionalized butadiene and styrene copolymer comprising a low styrene content can be within a range extending from 5% to 25%, preferably from 5% to 20%, more preferably from 10% to 19%.

Advantageously, the tin-functionalized butadiene and styrene copolymer has a glass transition temperature within a range extending from −70° C. to −30° C.

Preferably, according to the invention, the content of tin-functionalized butadiene and styrene copolymer is within a range extending from 30 to 80 phr, preferably from 35 to 80 phr or from 35 to 70 phr, preferably from 40 to 75 phr, preferably 50 to 75 phr.

The total content of isoprene elastomer and of tin-functionalized butadiene and styrene copolymer can be 100 phr. In other words, according to this embodiment, the elastomeric matrix of the composition of the tread of the aircraft tyre according to the invention comprises exclusively isoprene elastomer and tin-functionalized butadiene and styrene copolymer.

Alternatively, the total content of isoprene elastomer and of tin-functionalized butadiene and styrene copolymer may also be within a range extending from 45 to less than 100 phr. In other words, according to this embodiment, the elastomeric matrix of the composition of the tread of the aircraft tyre according to the invention comprises from more than 0 to 55 phr of another diene elastomer, in addition to the isoprene elastomer and the tin-functionalized butadiene and styrene copolymer. The total content of isoprene elastomer and of tin-functionalized butadiene and styrene copolymer can, for example, be within a range extending from 50 to less than 100 phr, preferably from 45 to 90 phr, preferably from 70 to 80 phr.

The term "other diene elastomer" is understood to mean a diene elastomer other than isoprene elastomer and than tin-functionalized butadiene and styrene copolymer.

The term "diene elastomer" should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

These diene elastomers are well known to those skilled in the art and diene elastomer capable of being used in the compositions is more particularly understood to mean:
- any homopolymer obtained by polymerization of a conjugated diene monomer having from 4 to 12 carbon atoms;
- any copolymer obtained by copolymerization of one or more conjugated dienes with one another or with one or more vinylaromatic compounds having from 8 to 20 carbon atoms.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, vinylmesitylene, divinylbenzene or vinylnaphthalene.

Preferably, according to this embodiment of the invention, the other diene elastomer can be selected from the group comprising or consisting of non-tin-functionalized butadiene and styrene copolymers, polybutadienes and mixtures thereof.

The non-tin-functionalized butadiene and styrene copolymer can, for example, be butadiene/styrene copolymer (SBR). It may be, for example, an SBR prepared in emulsion ("ESBR") or an SBR prepared in solution ("SSBR"). The contents of vinyl (1,2-), trans-1,4- and cis-1,4-bonds of the butadiene part of the SBR may be variable. For example, the vinyl content may be between 15% and 80% (mol %) and the content of trans-1,4-bonds between 15% and 80% (mol %).

Preferably, according to this embodiment of the invention, the other diene elastomer predominantly comprises a polybutadiene.

Preferably, the polybutadiene can, for example, be a polybutadiene predominantly comprising cis-1,4-bonds. It can, for example, be a composite polybutadiene comprising from 5% to 25% of syndiotactic 1,2-polybutadiene in a cis-1,4-polybutadiene matrix, for example "VCR412 Ubepol" from Ube, comprising 12% of syndiotactic 1,2-polybutadiene in a cis-1,4-polybutadiene matrix.

The content of the other diene elastomer can depend on the nature of this other diene elastomer. This content can be within a range extending from more than 0 to 50 phr, preferably from 10 to 55 phr, preferably from 20 to 30 phr.

In particular, when the other diene elastomer predominantly comprises a polybutadiene comprising predominantly cis-1,4 bonds, the content of diene elastomer may be in a range extending from 10 to 30 phr, preferably from 15 to 25 phr.

When the other diene elastomer predominantly comprises composite polybutadiene comprising from 5% to 25% of syndiotactic 1,2-polybutadiene in a cis-1,4-polybutadiene matrix, the content of the other diene elastomer is within a range extending from 10 to 55 phr, preferably from 30 to 55 phr, preferably from 40 to 55 phr, preferably from 45 to 50 phr.

II-2-b Reinforcing Filler

The middle rubber composition of the tread of the tyre according to the invention also comprises a reinforcing filler, known for its abilities to reinforce a rubber composition which can be used for the manufacture of tyres.

The reinforcing filler may comprise carbon black and/or a reinforcing inorganic filler (preferably a silica). Advantageously, the reinforcing filler predominantly, preferably exclusively, comprises carbon black.

The blacks which can be used in the context of the present invention can be any black conventionally used in tyres or their treads ("tyre-grade" blacks). Among the latter, mention will be made more particularly of the reinforcing carbon blacks of the 100, 200 and 300 series, or the blacks of the 500, 600 or 700 series (ASTM grades), for instance the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks might, for example, be already incorporated in the diene elastomer, in particular isoprene elastomer, in the form of a masterbatch (see, for example, applications WO 97/36724 or WO 99/16600).

Mention may be made, as examples of organic fillers other than carbon blacks, of functionalized polyvinyl organic fillers, such as described in applications WO 2006/069792, WO 2006/069793, WO 2008/003434 and WO 2008/003435.

Advantageously, the carbon black predominantly, preferably exclusively, comprises a carbon black having a BET specific surface area of less than greater than 80 $m^2/g$, preferably within a range extending between 80 and 170 $m^2/g$, more preferably between 120 and 145 $m^2/g$.

The BET specific surface area of the carbon blacks is measured according to Standard D6556-10 [multipoint (a minimum of 5 points) method—gas: nitrogen—relative pressure P/PO range: 0.1 to 0.3].

The term "reinforcing inorganic filler" should be understood here as meaning any inorganic or mineral filler, whatever its colour and its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of pneumatic tyres, in other words capable of replacing, in its reinforcing role, a conventional tyre-grade carbon black; such a filler is generally characterized, in a known way, by the presence of hydroxyl (—OH) groups at its surface.

The physical state in which the reinforcing inorganic filler is provided is not important, whether it is in the form of a powder, of microbeads, of granules, of beads or any other appropriate densified form. Of course, "reinforcing inorganic filler" is also understood to mean mixtures of different reinforcing inorganic fillers, in particular of highly dispersible siliceous and/or aluminous fillers such as described hereinafter.

Mineral fillers of the siliceous type, preferentially silica ($SiO_2$), are suitable in particular as reinforcing inorganic fillers. The silica used can be any reinforcing silica known to those skilled in the art, in particular any precipitated or fumed silica exhibiting a BET specific surface area and also a CTAB specific surface area both of less than 450 $m^2/g$, preferably from 30 to 400 $m^2/g$, in particular between 60 and 300 $m^2/g$.

The silicas or other reinforcing inorganic fillers that can be used in the context of the present invention can be any silica known to those skilled in the art, in particular any precipitated or fumed silica exhibiting a BET specific surface area and also a CTAB specific surface area both of less than 450 $m^2/g$, preferably from 30 to 400 $m^2/g$.

The BET specific surface area of the silica or reinforcing inorganic fillers is determined in a known manner by gas adsorption using the Brunauer-Emmett-Teller method described in "The Journal of the American Chemical Society" Vol. 60, page 309, February 1938, more specifically according to the French Standard NF ISO 9277 of December 1996 (multipoint (5 point) volumetric method—gas: nitrogen—degassing: 1 hour at 160° C.—relative pressure $p/p_0$ range: 0.05 to 0.17). The CTAB specific surface area of the silica is determined according to French Standard NF T 45-007 of November 1987 (method B).

Preferably, the reinforcing inorganic filler, preferably silica, has a BET specific surface area of less than 200 $m^2/g$ and/or a CTAB specific surface area of less than 220 $m^2/g$, preferably a BET specific surface area within a range extending from 125 to 200 $m^2/g$ and/or a CTAB specific surface area within a range extending from 140 to 170 $m^2/g$.

As reinforcing inorganic fillers that can be used in the context of the present invention, mention will be made, for example, of the highly dispersible precipitated silicas (termed "HDS") Ultrasil 7000 and Ultrasil 7005 from Evonik, the silicas Zeosil 1165MP, 1135MP and 1115MP from Rhodia, the silica Hi-Sil EZ150G from PPG, the silicas Zeopol 8715, 8745 and 8755 from Huber, the silicas with a high specific surface area as described in application WO 03/16837.

In order to couple the reinforcing silica to the diene elastomer, use is made, in a well-known way, of an at least bifunctional coupling agent (or bonding agent) intended to provide a satisfactory connection, of chemical and/or physical nature, between the silica (surface of its particles) and the diene elastomer. Use is made in particular of organosilanes or polyorganosiloxanes which are at least bifunctional.

Those skilled in the art can find coupling agent examples in the following documents: WO 02/083782, WO 02/30939, WO 02/31041, WO 2007/061550, WO 2006/125532, WO 2006/125533, WO 2006/125534, U.S. Pat. No. 6,849,754, WO 99/09036, WO 2006/023815, WO 2007/098080, WO 2010/072685 and WO 2008/055986.

Mention may in particular be made of alkoxysilane polysulfide compounds, especially bis(trialkoxysilylpropyl) polysulfides, very particularly bis(3-triethoxysilylpropyl) disulfide (abbreviated to "TESPD") and bis(3-triethoxysilylpropyl) tetrasulfide (abbreviated to "TESPT"). It should be remembered that TESPD, of formula $[(C_2H_5O)_3Si(CH_2)_3S]_2$, is in particular sold by Degussa under the name Si266 or Si75 (in the second case, in the form of a mixture of disulfide (at 75% by weight) and of polysulfides). TESPT, of formula $[(C_2H_5O)_3Si(CH_2)_5S]_2$, is sold in particular by Degussa under the name Si69 (or X50S when it is supported at 50% by weight on carbon black), in the form of a commercial mixture of polysulfides $S_x$ with a mean value for x which is close to 4.

The content of reinforcing filler, preferably carbon black, in the composition is preferably within a range extending from 20 to 100 phr, preferably from 25 to 75 phr, more preferably from 30 to 70 phr.

Furthermore, the content of reinforcing inorganic filler, preferably silica, in the composition is within a range extending from 0 to 20 phr, preferably from 1 to 15 phr.

II-2-c Crosslinking System

The system for crosslinking the middle rubber composition of the tread of the tyre according to the invention can be based on molecular sulfur and/or on sulfur donors and/or on peroxide, which are well known to those skilled in the art.

The crosslinking system is preferentially a vulcanization system based on sulfur (molecular sulfur and/or sulfur-donating agent).

The sulfur is used at a preferential content of between 0.5 and 10 phr. Advantageously, the content of sulfur is between 0.5 and 2 phr, preferably between 0.5 and 1.5 phr and more preferably between 0.5 and 1.4 phr.

The composition of the outer sidewall of the tyre according to the invention advantageously comprises a vulcanization accelerator, which is preferably selected from the group consisting of accelerators of the type of thiazoles and their derivatives, accelerators of the types of sulfenamides and thioureas and of mixtures thereof. Advantageously, the vulcanization accelerator is selected from the group consisting of 2-mercaptobenzothiazyl disulfide (MBTS), N-cyclohexyl-2-benzothiazolesulfenamide (CBS), N,N-dicyclohexyl-2-benzothiazolesulfenamide (DCBS), N-(tert-butyl)-2-benzothiazolesulfenamide (TBBS), N-(tert-butyl)-2-benzothiazolesulfenimide (TBSI), morpholine disulfide, N-morpholino-2-benzothiazolesulfenamide (MBS), dibutylthiourea (DBTU) and of mixtures thereof. Particularly preferably, the primary vulcanization accelerator is N-cyclohexyl-2-benzothiazolesulfenamide (CBS).

The content of vulcanization accelerator is preferentially within a range extending from 0.2 to 10 phr, preferably from 0.5 to 2 phr, preferably between 0.5 and 1.5 phr, more preferably between 0.5 and 1.4 phr.

II-2-d Plasticizers

Advantageously, the middle rubber composition of the tread of the tyre according to the invention can comprise from 1 to 30 phr of a plasticizing resin predominantly composed of units derived from aromatic and cycloaliphatic monomers. This resin is also referred to hereinbelow as an aromatic/cycloaliphatic resin.

Plasticizing resins are generally well known to those skilled in the art. They are also occasionally referred to as hydrocarbon-based resins or high-glass-transition-temperature resins.

As is known to those skilled in the art, the designation "plasticizing resin" is reserved in the present patent application, by definition, for a compound which is, on the one hand, solid at ambient temperature (23° C.) (as opposed to a liquid plasticizing compound, such as an oil).

Hydrocarbon-based resins are polymers that are well known to those skilled in the art, which are miscible by nature in diene elastomer composition, when they are additionally described as "plasticizing". They have been described, for example, in the work entitled "*Hydrocarbon Resins*" by R. Mildenberg, M. Zander and G. Collin (New York, V C H, 1997, ISBN 3-527-28617-9), Chapter 5 of which is devoted to their applications, notably in the tyre rubber field (5.5. "*Rubber Tires and Mechanical Goods*"). They may be aliphatic, aromatic or of the aliphatic/aromatic type, i.e. based on aliphatic and/or aromatic monomers. They can be natural or synthetic and may or may not be petroleum-based (if such is the case, they are also known under the name of petroleum resins). They are preferentially exclusively hydrocarbon-based, i.e. they include only carbon and hydrogen atoms.

The specific resin for the invention is predominantly composed of units derived from aromatic and cycloaliphatic monomers.

As cycloaliphatic monomers, the ones that are intended according to the present invention, and in a conventional manner for those skilled in the art, are saturated cyclic monomers, and the monomers in the group constituted by cyclopentadiene (abbreviated as CPD), dicyclopentadiene (abbreviated as DCPD), and mixtures thereof, will preferably be selected.

As aromatic monomers, the monomers in the group constituted by styrene, α-methylstyrene, vinyltoluene, indene and mixtures thereof will preferentially be selected.

Thus, preferably, the hydrocarbon-based resin predominantly composed of units derived from aromatic and cycloaliphatic monomers is such that the cycloaliphatic monomers are selected from the group constituted by cyclopentadiene, dicyclopentadiene and mixtures thereof, and the aromatic monomers are selected from the group constituted by styrene, α-methylstyrene, vinyltoluene, indene and mixtures thereof. More preferentially, the aromatic monomer is styrene.

The resin that is useful for the purposes of the invention, predominantly composed of units derived from aromatic and cycloaliphatic monomers, may comprise, in addition to these units and in a minor amount, aliphatic units, i.e. units based on aliphatic monomers, other than cycloaliphatic monomers. In this respect, the resin may comprise, in a minor amount, units derived from olefinic monomers.

The aromatic/cycloaliphatic resin preferably has a content of aromatic protons within a range extending from 3% to 40%, preferably from 5% to 30%. It also preferably has an ethylenic proton content within a range extending from 2% to 15%, preferably from 3% to 10%.

Also preferably, the aromatic/cycloaliphatic resin has a content of ethylenic protons within a range extending from 2% to 15%, preferably from 3% to 10%.

According to a preferential embodiment, the hydrocarbon-based resin that is useful for the purposes of the invention has a glass transition temperature (Tg) within a range extending from 30° C. to 150° C., preferably from 30° C. to 120° C.

The hydrocarbon-based resin that is useful for the purposes of the invention has an average molecular weight Mn within a range extending from 300 g/mol to 3000 g/mol and preferably from 400 to 1500 g/mol.

Preferably, the hydrocarbon-based resin that is useful for the purposes of the invention has a polydispersity index (PI) within a range extending from 1 to 4 and preferentially from 1.5 to 3.5.

Numerous hydrocarbon-based resins are available commercially. These resins may have characteristics, notably in terms of chemical composition, of Tg, of Mn, of aromatic or ethylenic proton content or of PI, which differ depending on the suppliers. As examples of aromatic/cycloaliphatic plasticizing resins, mention may be made notably of the commercial resins Novares TC160 (Mn=710 g/mol; Mw=2000 g/mol; PI=2.8, Tg=106° C.), Novares TC100 (Mn=460 g/mol; Mw=840 g/mol; PI=1.8, Tg=42° C.) sold by Rütgers, the resins Quintone 2940 (Mn=560 g/mol, Mw=1400 g/mol, PI=2.5, Tg=77° C.), sold by Nippon Zeon, and the resin LX1200-130 sold by Neville (Mn=660 g/mol, Mw=1900 g/mol, PI=2.8, Tg=60° C.).

The macrostructure (Mw, Mn, PI and Mz) of the hydrocarbon-based resin is determined by size exclusion chromatography (SEC) on the basis of Standards ISO 16014 (Determination of average molecular weight and molecular mass distribution of polymers using size exclusion chromatography), ASTM D5296 (Molecular weight averages and molecular weight distribution of polystyrene by high performance size exclusion chromatography) and DIN 55672 (size exclusion chromatography).

For these measurements, the resin sample is dissolved in antioxidant-free tetrahydrofuran up to a concentration of 1.5 g/l. The solution is filtered with a Teflon filter with a porosity of 0.45 μm, using, for example, a single-use syringe fitted with a filter. A volume of 100 μl is injected through a set of size exclusion chromatography columns. The mobile phase is eluted with a flow rate of 1 ml/min. The columns are thermostatically maintained at 35° C. in an oven. Detection is performed by a refractometer thermostatically maintained at 35° C. The stationary phase of the columns is based on a polystyrene/divinylbenzene gel having a controlled porosity. The polymer chains are separated according to the size which they occupy when they are dissolved in the solvent: the larger the volume they occupy, the less the pores of the columns are accessible to them and the shorter their elution time.

A Moore calibration curve connecting the logarithm of the molar mass (log M) to the elution time (et) is produced beforehand with polystyrene standards and modelled by a third degree polynomial: log(molar mass of polystyrene)=a+b et+c et2+d et3.

For the calibration curve, polystyrene standards with narrow molecular distributions are used (polydispersity index, PI, of less than or equal to 1.1). The range of molar masses of these standards extends from 160 to approximately 70 000 g/mol. These standards may be grouped together in "families" of 4 or 5 standards having a log M increment of approximately 0.55 between each family.

Use may be made of certified (ISO 13885 and DIN 55672) standard kits, for instance the kits of vials from PSS (Polymer Standards Service, reference PSS-pskitrl1-3), and also an additional PS standard with Mp=162 g/mol (Interchim, reference 178952). These kits are provided in the form of three vials each containing a family of polystyrene standards in suitable amounts:

Black vial: Mp=1220, 4850, 15 500 and 67 500 g/mol.
Blue vial: Mp=376, 3470, 10 400 and 46 000 g/mol.
Yellow vial: Mp=266, 1920, 7200 and 28 000 g/mol.
PS162: Mp=162 g/mol.

The number-average molar mass (Mn), the weight-average molar mass (Mw), the Mz and the polydispersity of the resin analysed are calculated from this calibration curve. This is why they are referred to as molar masses relative to a polystyrene calibration.

For the calculation of the average masses and of the PI, the limits of integration of the elution of the product are defined on the chromatogram corresponding to the injection of the sample. The refractometric signal defined between the two limits of integration is "cut" every second. For each of the "elementary cuts", the elution time ti and the area of the signal from the detector Ai are read off.

It is recalled here that: PI=Mw/Mn, with Mw the weight-average molecular weight and Mn the number-average molecular weight. It is also recalled that the weights Mw, Mn and Mz are average weights calculated from the formulae below:

$$Mz = \frac{\Sigma Ai * Mi^2}{\Sigma Ai * Mi}$$

$$Mn = \frac{\Sigma Ai}{\Sigma \frac{Ai}{Mi}}$$

$$Mw = \frac{\Sigma Ai * Mi}{\Sigma Ai}$$

in which Ai is the amplitude of the signal from the refractometric detector corresponding to the weight Mi and to the elution time ti.

The equipment used for the SEC measurement is a liquid chromatography system, for example the Waters Alliance 2690 system comprising a pump, a degasser and an injector; a differential refractometer (for example the Waters 2410 refractometer), software for acquiring and processing the data, for example the Waters Empower software, a column oven, for example the Waters "Column Heater Module", and four columns mounted in series in the following order:

TABLE 1

| Number | Brand | Range of molar masses (g/mol) | Length (mm) | Inside diameter (mm) | Particle size (μm) | Trade name | References (for information only) |
|---|---|---|---|---|---|---|---|
| Columns 1 and 2 | Polymer Laboratories | 200-400000 | 300 | 7.5 | 5 | MIXED-D | PL1110-6504 |
| Columns 3 and 4 | Polymer Laboratories | 200-30000 | 300 | 7.5 | 3 | MIXED-E | PL1110-6300 |

The aromatic proton content (% AH) and the ethylenic proton content (% EH) are measured by $^1$H NMR. This determination is performed with respect to all of the signals detected. Thus, the results obtained are expressed as percentage of the peak area.

The samples are dissolved in deuterated chloroform ($CDCl_3$) in a proportion of approximately 10 mg of resin in approximately 1 ml of solvent. The spectra are acquired on a Brüker Avance 500 MHz spectrometer equipped with a Brüker "broad band" BBO z-grad 5 mm probe. The $^1$H NMR experiment uses a 30° single pulse sequence and a repetition delay of 5 seconds between each acquisition. 64 accumulations are performed at ambient temperature. The chemical shifts are calibrated with respect to the protonated impurity of the deuterated chloroform; δ ppm $^1$H at 7.20 ppm. The $^1$H NMR signals of the aromatic protons are located between 8.5 ppm and 6.2 ppm. The ethylenic protons for their part give rise to signals between 6.2 ppm and 4.5 ppm. Finally, the signals corresponding to the aliphatic protons are located between 4.5 ppm and 0 ppm. The areas of each category of protons are taken relative to the sum of these areas to thus give a distribution in terms of an area percentage for each category of protons.

The content of aromatic/cycloaliphatic resin is preferentially within a range extending from 2 to 30 phr, more preferentially from 2 to 15 phr.

Preferably, for the invention, the composition of the aircraft tyre tread of the invention does not comprise any resin other than the C5 resin described above.

By way of example of aromatic/cycloaliphatic plasticizing resins, mention may in particular be made of the commercial resins Novares TC160 (Mn=710 g/mol; Mw=2000 g/mol; PI=2.8, Tg=106° C.), Novares TC100 (Mn=460 g/mol; Mw=840 g/mol; PI=1.8, Tg=42° C.) sold by Rutgers.

According to one particular embodiment, the plasticizing resin predominantly composed of units derived from aromatic and cycloaliphatic monomers an aromatic proton content of between 0 and 12%, an ethylenic proton content of greater than 3%, a number-average molecular weight of greater than 500 g/mol and a polydispersity index of greater than 2.

According to this embodiment, the aromatic/cycloaliphatic resin has an aromatic proton content of between 0 and 12%, preferably an aromatic proton content within a range extending from 1% to 10%, preferably from 2% to 7%.

Moreover, according to this embodiment, the aromatic/cycloaliphatic resin has an ethylenic proton content of greater than 3%, preferably an ethylenic proton content within a range extending from 3% to 7%.

According to this embodiment, the hydrocarbon-based resin useful for the needs of the invention can advantageously have a glass transition temperature (Tg) within a range extending from 30° C. to 150° C., preferably from 30° C. to 120° C.

Still according to this embodiment, the hydrocarbon-based resin useful for the needs of the invention can advantageously have a number-average molecular weight (Mn) of greater than 500 g/mol, preferably within a range extending from 500 g/mol to 1500 g/mol and preferably from 500 to 1000 g/mol.

According to this embodiment, the hydrocarbon-based resin useful for the needs of the invention can advantageously have a polydispersity index (PI) of greater than 2, preferably within a range extending from 2 to 5, and preferentially from 3 to 4.5.

According to this embodiment, the hydrocarbon-based resin predominantly composed of units derived from aromatic and cycloaliphatic monomers, advantageously also comprises units originating from pine derivatives, preferentially selected from the group consisting of alpha-pinene, beta-pinene, rosin, turpentine, tall oil and mixtures thereof. According to this preferential embodiment, the resin is also preferentially modified with maleic anhydride.

As an example of aromatic/cycloaliphatic plasticizing resins corresponding to this embodiment, mention may in particular be made of the DCPD/Aromatic hydrocarbon-based resin Nevroz 1420 from Neville.

Advantageously, regardless of the embodiment of the present invention, the middle rubber composition comprises 0 to 20 phr of a liquid plasticizer.

A plasticizer is regarded as being liquid when, at 23° C., it has the ability to ultimately assume the shape of its container, this definition being given in contrast to plasticizing resins, which are by nature solid at ambient temperature. Mention may be made, as liquid plasticizer, of vegetable oils, mineral oils, ether, ester, phosphate or sulfonate plasticizers, and mixtures thereof.

Preferentially, the content of liquid plasticizer of the middle rubber composition is equal to 0.

II-2-e Various Additives

The rubber compositions of the tread of the tyre according to the invention may optionally also comprise all or some of the usual additives customarily used in elastomer compositions for tyres, such as for example plasticizers (such as plasticizing oils and/or plasticizing resins), pigments, protective agents such as anti-ozone waxes, chemical anti-ozonants, antioxidants, anti-fatigue agents, reinforcing resins (as described for example in application WO 02/10269).

II-3 Lateral Rubber Composition

According to the invention, at least one lateral rubber composition is different from the middle rubber composition. The difference is advantageously linked to the absence of tin-functionalized butadiene and styrene copolymer, or through its presence at a content of less than 25 phr.

Thus, advantageously, the lateral rubber composition does not comprise a tin-functionalized butadiene and styrene copolymer, or comprises less than 25 phr thereof, preferably less than 15 phr thereof, more preferably still less than 10 phr thereof. Particularly advantageously, the lateral rubber composition does not comprise a tin-functionalized butadiene and styrene copolymer.

The at least one lateral rubber composition advantageously comprises at least one diene elastomer, a reinforcing filler and a crosslinking system, which the diene elastomer predominantly comprises at least one isoprene elastomer.

Particularly advantageously, the lateral rubber composition comprises more than 85 phr, preferably at least 90 phr, of at least one isoprene elastomer. More preferably, it comprises 100 phr of at least one isoprene elastomer.

The isoprene elastomer of the lateral rubber composition can be selected from the group consisting of natural rubber, synthetic polyisoprenes and mixtures thereof. Preferably, the at least one isoprene elastomer of the lateral rubber composition is a natural rubber.

The lateral rubber composition also advantageously comprises one or more reinforcing fillers, preferably selected from carbon blacks, silicas and mixtures thereof, preferably in a content within a range extending from 20 to 200 phr, preferably from 20 to 70 phr, more preferably from 40 to 55 phr. Advantageously, the reinforcing filler predominantly, preferably exclusively, comprises carbon black. The carbon black of the lateral rubber composition advantageously has a BET specific surface area of less than greater than 80 $m^2$/g, preferably within a range extending between 80 and 170 $m^2$/g, more preferably between 120 and 145 $m^2$/g.

The lateral rubber composition advantageously comprises a crosslinking system based on molecular sulfur and/or sulfur donors and/or peroxide, preferably based on molecular sulfur and/or sulfur donors, preferably in a content of between 0.5 and 12 phr, preferably between 1 and 10 phr.

Finally, the lateral rubber composition can comprise all or some of the usual additives customarily used in elastomer compositions for tyres, such as those mentioned above.

II-4 Rubber Composition of the Interlayer

Since the tyre comprises a crown reinforcement radially inside the tread, the tyre advantageously comprises an interlayer composed of a rubber composition, in contact by a radially outer face with at least the middle portion of the tread and by a radially inner face with the crown reinforcement. Contact of the radially outer face of the interlayer with at least the middle portion of the tread means that the axial width of this contact is at least equal to the axial width $L_C$ of the middle portion of the tread. Contact of the radially inner face of the interlayer with the crown reinforcement is contact with the protective reinforcement, which is the radially outermost portion of the crown reinforcement, intended to protect the working reinforcement, which is the radially innermost portion of the crown reinforcement. This interlayer, also referred to as connecting layer, guarantees better connection between the tread comprising a rubber composition according to the invention and the crown reinforcement.

The interlayer advantageously comprises at least one diene elastomer, a reinforcing filler and a crosslinking system, which the diene elastomer predominantly comprises at least one isoprene elastomer.

Particularly advantageously, the interlayer is as defined, preferably identical to the lateral rubber composition of the tread of the tyre according to the invention.

The interlayer can thus comprise more than 85 phr, preferably at least 90 phr, of at least one isoprene elastomer. More preferably, it comprises 100 phr of at least one isoprene elastomer.

The isoprene elastomer of the interlayer can be selected from the group consisting of natural rubber, synthetic polyisoprenes and mixtures thereof. Preferably, at least one isoprene elastomer of the interlayer is a natural rubber.

The interlayer also advantageously comprises one or more reinforcing fillers, preferably selected from carbon blacks, silicas and mixtures thereof, preferably in a content within a range extending from 20 to 200 phr, preferably from 20 to 70 phr, more preferably from to 55 phr. Advantageously, the reinforcing filler predominantly, preferably exclusively, comprises carbon black.

The interlayer advantageously comprises a crosslinking system based on molecular sulfur and/or sulfur donors and/or peroxide, preferably based on molecular sulfur and/or sulfur donors, preferably in a content of between 0.5 and 12 phr, preferably between 1 and 10 phr.

Finally, the interlayer can comprise all or some of the usual additives customarily used in elastomer compositions for tyres, such as those mentioned above.

II-5 Preparation of the Rubber Compositions

The middle and lateral rubber compositions of the tread and the composition of the interlayer of the tyre according to the invention can be manufactured in suitable mixers, using two successive preparation phases well known to those skilled in the art:

- a first phase of thermomechanical working or kneading ("non-productive" phase), which can be carried out in a single thermomechanical step during which all the necessary constituents, in particular the elastomeric matrix, the reinforcing filler and the optional other various additives, with the exception of the crosslinking system, are introduced into an appropriate mixer, such as a standard internal mixer (for example of "Banbury" type). The incorporation of the optional filler into the elastomer may be performed in one or more portions while thermomechanically kneading. In the case where the filler is already incorporated, in full or in part, in the elastomer in the form of a masterbatch, as is described, for example, in applications WO 97/36724 and WO 99/16600, it is the masterbatch which is directly kneaded and, if appropriate, the other elastomers or fillers present in the composition which are not in the masterbatch form, and also the optional other various additives other than the crosslinking system, are incorporated. The non-productive phase can be carried out at high temperature, up to a maximum temperature of between 110° C. and 200° C., preferably between 130° C. and 185° C., for a period of time generally of between 2 and 10 minutes;
- a second phase of mechanical working ("productive" phase), which is carried out in an external mixer, such as an open mill, after cooling the mixture obtained during the first non-productive phase down to a lower temperature, typically of less than 120° C., for example between 40° C. and 100° C. The crosslinking system is then incorporated and the combined mixture is then mixed for a few minutes, for example between 5 and 15 min.

Such phases have been described, for example, in patent applications EP-A-0501227, EP-A-0735088, EP-A-0810258, WO 00/05300 or WO 00/05301.

The final composition thus obtained is then calendered, for example in the form of a sheet or of a slab, in particular for characterization in the laboratory, or else extruded (or co-extruded with another rubber composition) in the form of a semi-finished (or profiled) element of rubber which can be used, for example, as a tyre tread. These products can subsequently be used for the manufacture of tyres, according to techniques known to those skilled in the art.

The composition may be either in the raw state (before crosslinking or vulcanization) or in the cured state (after crosslinking or vulcanization), may be a semi-finished product which can be used in a tyre.

The crosslinking of the composition can be carried out in a way known to those skilled in the art, for example at a temperature of between 130° C. and 200° C., under pressure.

IV—PREFERRED EMBODIMENTS

In the light of the aforementioned, the preferred embodiments of the invention are described below:

A. Aircraft tyre (1) comprising a tread (2) having an axial width L, the tread (2) comprising:
  a middle portion (3) having an axial width $L_C$ at least equal to 50% and at most equal to 80% of the axial width L of the tread and consisting of a middle rubber composition,
  and two lateral portions (41, 42) positioned axially on either side of the middle portion (3), each having an axial width ($L_{S1}$, $L_{S2}$) at least equal to 10% and at most equal to 25% of the axial width L of the tread and each consisting of a lateral rubber composition,
  characterized in that the middle rubber composition comprises at least one elastomeric matrix, a reinforcing filler and a crosslinking system, said elastomeric matrix comprising from 25 to 85 parts by weight per hundred parts by weight of elastomer, phr, of a tin-functionalized butadiene and styrene copolymer and from to 75 phr of isoprene elastomer, the total content of isoprene elastomer and of butadiene and of tin-functionalized butadiene and styrene copolymer in the middle rubber composition being within a range extending from 45 to 100 phr,
and in that at least one lateral rubber composition is different from the middle rubber composition.
B. Tyre (1) according to embodiment A, in which the content of the isoprene elastomer in the middle rubber composition is within a range extending from 20 to 65 phr, preferably from 25 to 60 phr.
C. Tyre (1) according to either one of the preceding embodiments, in which the isoprene elastomer of the middle rubber composition is selected from the group comprising natural rubber, synthetic polyisoprene, and mixtures thereof.
D. Tyre (1) according to any one of the preceding embodiments, in which the isoprene elastomer of the middle rubber composition is a natural rubber.
E. Tyre (1) according to any one of the preceding embodiments, in which the content of tin-functionalized butadiene and styrene copolymer in the middle rubber composition is within a range extending from 35 to 80, preferably from 40 to 75 phr.
F. Tyre (1) according to any one of the preceding embodiments, in which the tin-functionalized butadiene and styrene copolymer of the middle rubber composition is a tin-functional butadiene and styrene copolymer with a low styrene content, the styrene content being within a range extending from 5% to 25%, preferably from 5% to 20%, more preferably from 10% to 19%.
G. Tyre (1) according to any one of the preceding embodiments, in which the tin-functionalized butadiene and styrene copolymer of the middle rubber composition has a glass transition temperature within a range extending from −70° C. to −30° C.
H. Tyre (1) according to any one of the preceding embodiments, in which the total content of isoprene elastomer and of tin-functionalized butadiene and styrene copolymer in the middle rubber composition is 100 phr.
I. Tyre (1) according to any one of embodiments A to G, in which the elastomeric matrix of the middle rubber composition comprises from more than 0 to 55 phr, preferably from more than 0 to 50 phr of another diene elastomer.
J. Tyre (1) according to embodiment I, in which the other diene elastomer of the middle rubber composition is selected from the group consisting of non-tin-functionalized butadiene and styrene copolymers, polybutadienes, and mixtures thereof.
K. Tyre (1) according to embodiment I or J, in which the other diene elastomer of the middle rubber composition predominantly comprises a polybutadiene, preferably comprising predominantly cis-1,4 bonds.
L. Tyre (1) according to embodiment K, in which the content of the other diene elastomer in the middle rubber composition is within a range extending from 10 to 30 phr, preferably from 15 to 25 phr.
M. Tyre (1) according to embodiment I or J, in which the other diene elastomer of the middle rubber composition predominantly comprises a polybutadiene a composite polybutadiene, which comprises from 5% to 25% of 1,2-syndiotactic polybutadiene in a matrix of cis-1,4-polybutadiene.
N. Tyre (1) according to embodiment M, in which the content of the other diene elastomer is within a range extending from 10 to 55 phr, preferably from 40 to 55 phr.
O. Tyre (1) according to any one of the preceding embodiments, in which the reinforcing filler of the middle rubber composition comprises carbon black and/or a reinforcing inorganic filler.
P. Tyre (1) according to embodiment O, in which the inorganic filler is a silica.
Q. Tyre (1) according to any one of the preceding embodiments, in which the reinforcing filler of the middle rubber composition comprises predominantly, preferably exclusively, carbon black.
R. Tyre (1) according to any one of the preceding embodiments, in which the content of reinforcing filler, preferably of carbon black, in the middle rubber composition is within a range extending from 20 to 100 phr, preferably from 25 to 75 phr, more preferably from 30 to 70 phr.
S. Tyre (1) according to any one of embodiments O to R, in which the content of reinforcing inorganic filler, preferably of silica, in the middle rubber composition is within a range extending from 0 to 20 phr, preferably from 1 to 15 phr.
T. Tyre (1) according to any one of embodiments O to S, in which in which the carbon black of the middle rubber composition has a BET specific surface area of between 80 and 170 m$^2$/g, preferably between 120 and 145 m$^2$/g.
U. Tyre (1) according to any one of the preceding embodiments, in which the middle rubber composition also comprises from 1 to 30 phr of at least one hydrocarbon-based resin predominantly composed of units derived from aromatic and cycloaliphatic monomers.
V. Tyre (1) according to embodiment U, in which the hydrocarbon-based resin predominantly composed of units derived from aromatic and cycloaliphatic monomers is such that the cycloaliphatic monomers are selected from the group consisting of cyclopentadiene, dicyclopentadiene and mixtures thereof, and the aromatic monomers are selected from the group consisting of styrene, alpha-methylstyrene, vinyltoluene, indene and mixtures thereof.
W. Tyre (1) according to embodiment U or V, in which the hydrocarbon-based resin predominantly composed of units derived from aromatic and cycloaliphatic monomers has a glass transition temperature within a range extending from 30° C. to 150° C., preferably from 30° C. to 120° C.
X. Tyre according to any one of embodiments U to W, in which the hydrocarbon-based resin predominantly composed of units derived from aromatic and cycloaliphatic monomers has an average molecular weight Mn within a range extending from 300 g/mol to 3000 g/mol and preferably from 400 to 1500 g/mol.
Y. Tyre according to any one of embodiments U to X, in which the hydrocarbon-based resin predominantly composed of units derived from aromatic and cycloaliphatic monomers has an aromatic proton content within a range extending from 3% to 40%, preferably from 5% to 30%.
Z. Tyre according to any one of embodiments U to Y, in which the hydrocarbon-based resin predominantly composed of units derived from aromatic and cycloaliphatic monomers has an ethylenic proton content within a range extending from 2% to 15%, preferably from 3% to 10%.
AA. Tyre according to any one of embodiments U to Z, in which the hydrocarbon-based resin predominantly composed of units derived from aromatic and cycloaliphatic monomers has a polydispersity index within a range extending from 1 to 4, preferentially from 1.5 to 3.5.

BB. Tyre (1) according to any one of embodiments U to W, in which the hydrocarbon-based resin predominantly composed of units derived from aromatic and cycloaliphatic monomers has an aromatic proton content of between 0 and 12%, an ethylenic proton content of greater than 3%, a number-average molecular weight of greater than 500 g/mol and a polydispersity index of greater than 2.

CC. Tyre (1) according to embodiment BB, in which the hydrocarbon-based resin predominantly composed of units derived from aromatic and cycloaliphatic monomers has an aromatic proton content within a range extending from 1% to 10%, preferably from 2% to 7%.

DD. Tyre (1) according to embodiment BB or CC, in which the hydrocarbon-based resin predominantly composed of units derived from aromatic and cycloaliphatic monomers has an ethylenic proton content within a range extending from 3% to 7%.

EE. Tyre (1) according to any one of embodiments BB to DD, in which the hydrocarbon-based resin predominantly composed of units derived from aromatic and cycloaliphatic monomers has an average molecular weight Mn within a range extending from 500 g/mol to 1500 g/mol and preferably from 500 to 1000 g/mol.

FF. Tyre (1) according to any one of embodiments BB to EE, in which the hydrocarbon-based resin predominantly composed of units derived from aromatic and cycloaliphatic monomers has a polydispersity index within a range extending from 2 to 5, preferentially from 3 to 4.5.

GG. Tyre (1) according to any one of embodiments BB to FF, in which the hydrocarbon-based resin predominantly composed of units derived from aromatic and cycloaliphatic monomers also comprises units originating from pine derivatives, preferentially selected from the group consisting of alpha-pinene, beta-pinene, rosin, turpentine, tall oil and mixtures thereof.

HH. Tyre (1) according to any one of embodiments U to HH, in which the content of hydrocarbon-based resin predominantly composed of units derived from aromatic and cycloaliphatic monomers, in the middle rubber composition, is within a range extending from 2 to 30 phr, more preferentially from 2 to 15 phr.

II. Tyre (1) according to any one of the preceding embodiments, in which the middle rubber composition does not comprise liquid plasticizer or comprises less than 20 phr thereof, preferably less than 10 phr thereof.

JJ. Tyre (1) according to any one of the preceding embodiments, in which the middle rubber composition does not comprise liquid plasticizer.

KK. Tyre (1) according to any one of the preceding embodiments, in which the at least one lateral rubber composition comprises at least one diene elastomer, a reinforcing filler and a crosslinking system, which the diene elastomer predominantly comprises at least one isoprene elastomer.

LL. Tyre (1) according to any one of the preceding embodiments, in which the lateral rubber composition comprises more than 85 phr, preferably at least 90 phr, of at least one isoprene elastomer.

MM. Tyre (1) according to any one of the preceding embodiments, in which the lateral rubber composition comprises 100 phr of at least one isoprene elastomer.

NN. Tyre (1) according to any one of embodiments KK to MM, in which the at least one isoprene elastomer of the lateral rubber composition is selected from the group consisting of natural rubber, synthetic polyisoprenes and mixtures thereof, preferably the at least one isoprene elastomer of the lateral rubber composition is a natural rubber.

OO. Tyre (1) according to any one of the preceding embodiments, in which the two lateral portions (41, 42), positioned axially on either side of the middle portion (3), are different from the middle rubber composition.

PP. Tyre (1) according to any one of the preceding embodiments, in which the two lateral portions (41, 42), positioned axially on either side of the middle portion (3), consist of identical lateral rubber compositions.

QQ. Tyre (1) according to any one of the preceding embodiments, in which the two lateral portions (41, 42), positioned axially on either side of the middle portion (3), have identical widths ($L_{S1}$, $L_{S2}$).

RR. Tyre (1) according to any one of the preceding embodiments, the tyre comprising a crown reinforcement (5) radially inside the tread (2), in which the tyre (1) comprises an interlayer (7) consisting of at least one rubber composition in contact by a radially outer face with at least the middle portion (3) of the tread (2) and by a radially inner face with the crown reinforcement (5).

SS. Tyre (1) according to embodiment RR, in which the interlayer (7) consists of a rubber composition comprising natural rubber.

TT. Tyre (1) according to any one of the preceding embodiments, the tyre comprising a carcass reinforcement (6) consisting of from 2 to 12, preferably from 5 to 10 carcass layers.

UU. Tyre (1) according to any one of the preceding embodiments, the dimension of which is greater than or equal to 18 inches, preferably from 20 to 23 inches.

V—EXAMPLES

V-1 Measurements and Tests Used

Tensile Tests (Examples 1 and 2)

These tensile tests make it possible to determine the moduli of elasticity and the properties at break and are based on Standard NF ISO 37 of December 2005 on a type-2 dumbbell test specimen. The elongation at break thus measured at 60° C. is expressed as % of elongation.

Tensile Tests (Examples 3 and 4)

These tests make it possible to determine the elasticity stresses and the properties at break; those performed on cured mixtures are performed in accordance with Standard AFNOR-NF-T46-002 of September 1988.

The elongations at break (in %) are measured at two temperatures: at 23° C. and at 100° C., under standard hygrometry conditions (50% relative humidity), according to French Standard NF T 40-101 (December 1979), the breaking stresses (in MPa) and the impact energy may also be measured, the impact energy (breaking energy) being the product of the breaking stress and the elongation at break. The results are given in base 100, i.e. the values are expressed relative to a control, the elongation at break of which is considered as the reference at 100.

Loss in Weight

This test makes it possible to determine the loss in weight of a sample of aircraft tyre tread composition when it is subjected to an abrasion test on a high-speed abrasion tester.

The high-speed abrasion test is carried out according to the principle described in the paper by S. K. Clark, "*Touch-down dynamics*", *Precision Measurement Company*, Ann Arbor, MI, *NASA*, 35 *Langley Research Center, Computational Modeling of Tires*, pages 9-19, published in August 1995. The tread material rubs over a surface, such as a Norton Vulcan A30S-BF42 disc. The linear speed during contact is 70 m/s with a mean contact pressure of 15 to 20 bar. An energy of 10 to 20 $MJ/m^2$ of contact surface is brought into play during the experiment.

The components of the constant-energy tribometry device according to the abovementioned paper by S. K. Clark are a motor, a clutch, a rotating plate and a sample holder.

Components of the constant-energy tribometry device according to the abovementioned paper by S. K. Clark:
  small wheel (toroidal ring made of test material mounted on a grooved pulley)
  rotating plate, for example consisting of a Norton disc integral with the axis of an electric motor and of a flywheel.

The performance is evaluated on the basis of the loss in weight according to the following formula:

[Loss in weight performance=loss in weight control/ loss in weight sample]

The results are expressed in base 100. A performance for the sample of greater than 100 is regarded as better than the control.

Dynamic Properties (after Curing)

The dynamic properties G* and tan(δ)max are measured on a viscosity analyser (Metravib V A4000) according to Standard ASTM D 5992-96. The response of a sample of vulcanized composition (cylindrical test specimen with a thickness of 4 mm and a cross section of 400 $mm^2$), subjected to a simple alternating sinusoidal shear stress, at a frequency of 10 Hz, at 60° C., according to Standard ASTM D 1349-99, is recorded. A peak-to-peak strain amplitude sweep is performed from 0.1% to 50% (outward cycle) and then from 50% to 1% (return cycle). The results exploited are the complex dynamic shear modulus (G*) and the loss factor tan(δ). The maximum value of tan(δ) observed (tan (δ)max) and the difference in complex modulus (G*) between the values at 0.1% and at 50% strain (Payne effect) are shown for the return cycle. The lower the value for the values of tan(δ)max at 60° C., the lower will be the hysteresis of the composition and thus the lower will be the heating.

Tearability

The tearability indices are measured at two temperatures: at 23° C. and at 100° C. The force to be exerted in order to obtain breaking (FRD, in N/mm) is notably determined and the breaking strain (DRD, in %) is measured on a test specimen with dimensions of 10×85×2.5 mm notched at the centre of its length with three notches to a depth of 5 mm, in order to bring about breaking of the test specimen. Thus, the energy for bringing about breaking (energy) of the test specimen, which is the product of the FRD and DRD, can be determined. The results are given in base 100, i.e. the values are expressed relative to a control, the breaking strain (DRD) of which is considered as the reference at 100.

Scorch Time (or Fixing Time)

The measurements are taken at 130° C., in accordance with French Standard NF T 43-005. The change in the consistometric index as a function of time makes it possible to determine the scorch time of the rubber compositions, which is assessed in accordance with the abovementioned standard by the parameter T5 (case of a large rotor), expressed in minutes, and defined as being the time necessary to obtain an increase in the consistometric index (expressed in MU) of 5 units above the minimum value measured for this index.

Microstructure of the Elastomers

Regarding the composition of the elastomers, the microstructure is generally determined by $^1$H NMR analysis, supplemented by $^{13}$C NMR analysis when the resolution of the $^1$H NMR spectra does not enable the attribution and quantification of all the species. The measurements are carried out using a Bruker 500 MHz NMR spectrometer at frequencies of 500.43 MHz for the observation of the proton and 125.83 MHz for the observation of carbon. For the measurements of mixtures or elastomers which are insoluble but which have the ability to swell in a solvent, an HRMAS z-grad 4 mm probe is used, making it possible to observe protons and carbons in proton-decoupled mode. The spectra are acquired at rotational speeds of 4000 Hz to 5000 Hz. For the measurements on soluble elastomers, a liquid NMR probe is used for proton and carbon observation in proton-decoupled mode. The preparation of the insoluble samples is performed in rotors filled with the analysed material and a deuterated solvent enabling swelling, generally deuterated chloroform ($CDCl_3$). The solvent used must always be deuterated and its chemical nature may be adapted by those skilled in the art. The amounts of material used are adjusted so as to obtain spectra of sufficient sensitivity and resolution. The soluble samples are dissolved in a deuterated solvent (about 25 mg of elastomer in 1 ml), generally deuterated chloroform ($CDCl_3$). The solvent or solvent blend used must always be deuterated and its chemical nature may be adapted by those skilled in the art. The sequences used for proton NMR and carbon NMR, respectively, are identical for a soluble sample and for a swelled sample. A 30° single pulse sequence is used for proton NMR. The spectral window is set to observe all of the resonance lines belonging to the analysed molecules. The number of accumulations is set so as to obtain a signal-to-noise ratio that is sufficient for quantification of each unit. The recycle delay between each pulse is adapted to obtain a quantitative measurement. A 30° single pulse sequence is used for carbon NMR, with proton decoupling only during the acquisition to avoid nuclear Overhauser effects (NOE) and to remain quantitative. The spectral window is set to observe all of the resonance lines belonging to the analysed molecules. The number of accumulations is set so as to obtain a signal-to-noise ratio that is sufficient for quantification of each unit. The recycle delay between each pulse is adapted to obtain a quantitative measurement. The NMR measurements are performed at 25° C.

V-2 Preparation of the Compositions

In the examples which follow, the rubber compositions were produced as described in point II-5 above. In particular, the diene elastomers, the reinforcing fillers and also the various other ingredients, with the exception of the vulcanization system, are successively introduced into an internal mixer (final degree of filling: approximately 70% by volume), the initial vessel temperature of which is approximately 80° C. Thermomechanical working (non-productive phase) is then performed in one step, which lasts in total approximately 3 to 4 min, until a maximum "dropping" temperature of 165° C. is reached. The mixture thus obtained is recovered and cooled, and sulfur and a sulfamide-type accelerator are then incorporated on a mixer (homofinisher) at 70° C., everything being mixed (productive phase) for an appropriate time (for example approximately ten minutes).

V-3 Tests on Rubber Compositions

Example 1

The purpose of this example is to show the influence of the rate of incorporation of tin-functionalized SBR in compositions of the middle portion of the tread of aircraft tyres on the performance compromise between wear resistance and the preservation of mechanical and thermal properties.

T1, T2 and T3 are control compositions. T1 corresponds to the composition of an aircraft tread conventionally used by those skilled in the art; it is based on natural rubber as sole elastomer. T2 corresponds to a tread composition in which the natural rubber has been replaced by a tin-functionalized SBR. T3 corresponds to a tread composition in which half of the natural rubber has been replaced by a polybutadiene.

The tests C1 to C3 are in accordance with the invention. The compositions C to C3 differ in the respective contents of natural rubber and of tin-functionalized SBR.

The performance results for loss in weight and for elongation at break at 60° C. are expressed as percentage, base 100, with respect to the control composition T1 corresponding to the ordinary tread compositions.

Table 2 shows the compositions tested (in phr), as well as the results obtained.

TABLE 2

| | T1 | C1 | C2 | C3 | T2 | T3 |
|---|---|---|---|---|---|---|
| NR (1) | 100 | 70 | 50 | 25 | — | 50 |
| SBR (2) | — | 30 | 50 | 75 | 100 | — |
| BR (3) | — | — | — | — | — | 50 |
| Carbon black (4) | 49 | 49 | 49 | 49 | 49 | 49 |
| Antioxidant (5) | 1.5 | 1.5 | 1.5 | 1.5 | 1.5 | 1.5 |
| Anti-ozone wax | 1 | 1 | 1 | 1 | 1 | 1 |
| Stearic acid | 2.5 | 2.5 | 2.5 | 2.5 | 2.5 | 2.5 |
| Zinc oxide (6) | 3 | 3 | 3 | 3 | 3 | 3 |
| Accelerator (7) | 0.85 | 0.85 | 0.85 | 0.85 | 0.85 | 0.85 |
| Sulfur | 1.6 | 1.6 | 1.6 | 1.6 | 1.6 | 1.6 |
| Performance Loss in weight as % base 100 relative to T1 | 100 | 105 | 114 | 126 | 157 | 102 |
| Elongation at break at 60° C. as % base 100 relative to T1 | 100 | 91 | 82 | 80 | 59 | 85 |
| Tan(δ)max at 60° C. | 0.19 | 0.18 | 0.18 | 0.17 | 0.17 | 0.17 |

(1) Natural rubber
(2) Tin-functionalized solution SBR, with 24% of 1,2-polybutadiene units, 15.5% of styrene units – Tg = –65° C.
(3) Neodymium polybutadiene, 98% 1,4-cis- – Tg = –108° C.
(4) Carbon black of N234 grade according to Standard ASTM D-1765
(5) N-(1,3-Dimethylbutyl)-N-phenyl-para-phenylenediamine, Santoflex 6-PPD from Flexsys
(6) Zinc oxide of industrial grade from Umicore
(7) N-Cyclohexyl-2-benzothiazolesulfenamide, Santocure CBS from Flexsys The results presented in Table 2 above show that the loss in weight performance, representative of a better wear resistance during the landing phase, of the compositions C1 to C3 is always significantly improved with respect to the control.

Furthermore, these compositions C1 to C3 exhibit an elongation at break at 60° C. which is lower by 20%, with respect to the control T1 (composition of an aircraft tread conventionally used by those skilled in the art to manufacture an aircraft tyre tread), which remains an acceptable level for the mechanical properties. Beyond a fall of 20% with respect to T1, it may be considered that the mechanical properties might no longer be regarded as sufficient for the tread composition to be used on aircraft tyres.

The above results also show that the thermal stability of the composition, represented by the tan(δ)max values at 60° C., is maintained, indeed even improved, with respect to the control T1.

As shown by the results for the composition T2, the absence of natural rubber in the composition brings about a strong fall in the mechanical properties. In addition, the composition T3, corresponding to a tread composition in which half of the natural rubber has been replaced by a polybutadiene, does not make it possible to significantly improve the wear resistance.

Thus, only the middle compositions in accordance with the invention have the advantage of allowing better wear resistance of the middle portion of the tread during the landing phase of the aircraft, while at the same time maintaining, or even improving, the thermal properties of the composition and keeping the mechanical properties at an acceptable level. It is observed that the use of 45 to 75 phr of tin-functionalized SBR in the composition results in a better performance compromise between the wear resistance and the maintenance of the thermal and mechanical properties.

Example 2

The purpose of this example is to show the influence of the incorporation of other diene elastomers in addition to the tin-functionalized SBR on the performance compromise between wear resistance and the preservation of the mechanical and thermal properties of the middle portion of the tread.

C2 corresponds to the composition C2 of Example 1. It corresponds to an embodiment of the invention in which only the tin-functionalized SBR is present in addition to the diene elastomer.

Tests C4 and C5 are also in accordance with the middle rubber composition according to the invention. The compositions C4 and C5 comprise additional synthetic elastomers different in nature, as shown in Table 3 below.

The performance results for loss in weight and for elongation at break at 60° C. are expressed as percentage, base 100, with respect to the control composition C1 of Example 1.

Table 3 shows the compositions tested (in phr), as well as the results obtained.

TABLE 3

| | C2 | C4 | C5 |
|---|---|---|---|
| NR (1) | 50 | 35 | 30 |
| SBR (2) | 50 | 45 | — |
| SBR (8) | — | — | 20 |
| BR (3) | — | 20 | — |
| VCR412 (9) | — | — | 50 |
| Carbon black (4) | 49 | 49 | 49 |
| Antioxidant (5) | 1.5 | 1.5 | 1.5 |
| Anti-ozone wax | 1 | 1 | 1 |
| Stearic acid | 2.5 | 2.5 | 2.5 |
| Zinc oxide (6) | 3 | 3 | 3 |
| Accelerator (7) | 0.85 | 0.85 | 0.85 |
| Sulfur | 1.6 | 1.6 | 1.6 |
| Performance Loss in weight as % base 100 relative to T1 | 114 | 118 | 138 |

TABLE 3-continued

|  | C2 | C4 | C5 |
|---|---|---|---|
| Elongation at break at 60° C. as % base 100 relative to T1 | 82 | 108 | 95 |
| Tan(δ) at 60° C. | 0.18 | 0.18 | 0.20 |

(1) to (7): see Table 2
(8) Tin-functionalized solution SBR, with 24% of 1,2-polybutadiene units, 26.5% of styrene units – Tg = –48° C.
(9) VCR412 Ubepol from Ube-composite polybutadiene: 12% of syndiotactic 1,2-polybutadiene in a cis-1,4-polybutadiene matrix The results presented in Table 3 above show that the loss in weight performance, representative of a better wear resistance during the landing phase, of the compositions C4 and C5 is always significantly improved with respect to the control T1 and are comparable with, indeed even superior to, the composition C2 in accordance with the present invention.

Furthermore, these compositions exhibit an elongation at break at 60° C. which is much less than 20%, indeed even greater, relative to the control T1, and the thermal stability of the composition is also maintained, relative to the control T1. These results are comparable with, indeed even superior to, the composition C2 in accordance with the present invention.

Thus, the middle rubber compositions in accordance with the invention, whether they do or do not comprise another diene elastomer in addition to the isoprene elastomer and the tin-functionalized SBR, have the advantage of providing a better wear resistance during the landing phase of the aircraft, while maintaining, indeed even improving, the thermal properties of the composition and while retaining good mechanical properties.

Example 3

The aim of these examples is to show the influence of the incorporation of the hydrocarbon-based resin predominantly composed of dicyclopentadiene and aromatic units into aircraft tyre tread compositions on the performance compromise between the cut resistance and the scorch time. Three types of elastomer matrices were tested.

Tables 4 and 5 show all of the compositions tested (in phr), and also the results obtained.

T4 and T5 are control compositions. Compositions C6 to C12 are in accordance with the invention.

The performance results in terms of elongation at break at 23° C. and at 100° C. are expressed as base 100 percentages relative to the control composition, and similarly for the performance results in terms of tear strength at 23° C. and at 100° C. The increase in the scorch time is expressed in minutes relative to the control.

TABLE 4

|  | T4 | C6 | C7 | C8 | C9 |
|---|---|---|---|---|---|
| NR (1) | 50 | 50 | 50 | 50 | 50 |
| SBR (2) | 50 | 50 | 50 | 50 | 50 |
| Carbon black (10) | 49 | 49 | 49 | 49 | 49 |
| Silica (12) | 5 | 5 | 5 | 5 | 5 |
| Coupling agent (13) | 1 | 1 | 1 | 1 | 1 |
| Hydrocarbon-based resin (11) | 0 | 2.5 | 5 | 7.5 | 10 |
| Antioxidant (5) | 1.5 | 1.5 | 1.5 | 1.5 | 1.5 |
| Anti-ozone wax | 1 | 1 | 1 | 1 | 1 |
| Stearic acid | 2.5 | 2.5 | 2.5 | 2.5 | 2.5 |
| ZnO (6) | 3 | 3 | 3 | 3 | 3 |
| Accelerator (7) | 0.8 | 0.8 | 0.8 | 0.8 | 0.8 |
| Sulfur | 1.5 | 1.5 | 1.5 | 1.5 | 1.5 |

TABLE 4-continued

|  | T4 | C6 | C7 | C8 | C9 |
|---|---|---|---|---|---|
| Elongation at break at 23° C. (base 100) | 100 | 104 | 116 | 121 | 123 |
| Elongation at break at 100° C. (base 100) | 100 | 115 | 130 | 142 | 157 |
| DRD at 23° C. (base 100) | 100 | 113 | 143 | 177 | 189 |
| DRD at 100° C. (base 100) | 100 | 113 | 144 | 179 | 108 |
| Increase in scorch time (minutes) | 0 | 15 | 17 | 20 | 22 |

(1), (2), (5) to (7): see Table 2
(10) Carbon black of N115 grade according to Standard ASTM D-1765
(11) DCPD/Aromatic hydrocarbon-based resin Novares TC160 from Rütgers Mn = 710 g/mol; Mw = 2000 g/mol; PI = 2.8, Tg = 106° C. Aromatic protons: 13%, Ethylenic protons: 5.6%, Aliphatic protons: 81.4%
(12) Silica, Zeosil 1165 MP from Solvay-Rhodia, HDS type
(13) Silane

TABLE 5

|  | T5 | C10 | C11 | C12 |
|---|---|---|---|---|
| NR (1) | 35 | 35 | 35 | 35 |
| SBR (2) | 65 | 65 | 65 | 65 |
| Carbon black (10) | 49 | 49 | 49 | 49 |
| Silica (12) | 5 | 5 | 5 | 5 |
| Coupling agent (13) | 1 | 1 | 1 | 1 |
| Hydrocarbon-based resin (11) | 0 | 5 | 7.5 | 10 |
| Antioxidant (5) | 1.5 | 1.5 | 1.5 | 1.5 |
| Anti-ozone wax | 1 | 1 | 1 | 1 |
| Stearic acid | 2.5 | 2.5 | 2.5 | 2.5 |
| ZnO (6) | 3 | 3 | 3 | 3 |
| Accelerator (7) | 0.8 | 0.8 | 0.8 | 0.8 |
| Sulfur | 1.5 | 1.5 | 1.5 | 1.5 |
| Elongation at break at 23° C. (base 100) | 100 | 116 | 128 | 132 |
| Elongation at break at 100° C. (base 100) | 100 | 101 | 102 | 99 |
| DRD at 23° C. (base 100) | 100 | 146 | 147 | 216 |
| DRD at 100° C. (base 100) | 100 | 131 | 149 | 162 |
| Increase in scorch time (minutes) | 0 | 18 | 20 | 22 |

(1), (2), (5) to (7): see Table 2
(10) to (13): see Table 4

These results show that the cut resistance performance as represented by the elongation at break and tearability measurements, both at 23° C. and 100° C., are very much improved by the invention. Similarly, the scorch time is substantially lengthened, making it possible to increase the industrial productivity during the manufacture of aircraft tyres.

Example 4

The aim of these examples is to show the influence of the incorporation of a specific hydrocarbon-based resin into middle rubber compositions of a tread of aircraft tyres on the performance compromise between cut resistance and processability. Two types of elastomeric matrices were tested.

Table 6 shows all of the compositions tested (in phr) and also the results obtained.

T6 is a control composition. Compositions C13 to C15 are in accordance with the invention.

The results of performance in elongation at break at 23° C. and at 100° C. are expressed as percentage base 100 relative to the control composition, as are the results of performance in tear strength at 23° C. and at 100° C. Processability is represented by Mooney viscosity values in Mooney units.

TABLE 6

|  | T6 | C13 | C14 | C15 |
|---|---|---|---|---|
| NR (1) | 50 | 50 | 50 | 50 |
| SBR (2) | 50 | 50 | 50 | 50 |
| Carbon black (10) | 49 | 49 | 49 | 49 |
| Silica (12) | 5 | 5 | 5 | 5 |
| Coupling agent (13) | 1 | 1 | 1 | 1 |
| Hydrocarbon-based resin (14) | 0 | 5 | 7.5 | 10 |
| Antioxidant (5) | 1.5 | 1.5 | 1.5 | 1.5 |
| Anti-ozone wax | 1 | 1 | 1 | 1 |
| Stearic acid | 2.5 | 2.5 | 2.5 | 2.5 |
| ZnO (6) | 3 | 3 | 3 | 3 |
| Accelerator (7) | 0.8 | 0.8 | 0.8 | 0.8 |
| Sulfur | 1.5 | 1.5 | 1.5 | 1.5 |
| Elongation at break at 23° C. (base 100) | 100 | 112 | 121 | 122 |
| Elongation at break at 100° C. (base 100) | 100 | 130 | 143 | 159 |
| DRD at 23° C. (base 100) | 100 | 152 | 185 | 190 |
| DRD at 100° C. (base 100) | 100 | 162 | 198 | 230 |
| Mooney viscosity (MU) | 94 | 89 | 87 | 87 |

(1), (2), (5) to (7): see Table 2
(10), (12) and (13): see Table 4
(14) DCPD/Aromatic Nevroz 1420 hydrocarbon-based resin from Neville Mn = 913 g/mol; Mw = 3540 g/mol; PI = 3.9, Tg = 90° C. Aromatic protons: 3%, Ethylenic protons: 5%, Aliphatic protons: 92%, also including further units derived from pine derivatives All the results show that the performances in terms of cut resistance as represented by the elongation at break and tearability measurements, both at 23° C. and 100° C., are greatly improved by the embodiment of the invention according to which the middle rubber composition of the tread comprises at least one hydrocarbon-based resin predominantly composed of units derived from aromatic and cycloaliphatic monomers. At the same time, the Mooney viscosity is reduced in the compositions useful for the invention, making it possible to increase industrial productivity during the manufacture of aircraft tyres.

In summary, the middle rubber compositions in accordance with the invention, based on at least in particular from 25 to 85 phr of a tin-functionalized butadiene and styrene copolymer and from 15 to 75 phr of isoprene elastomer, constituting the middle portion of the tread of an aircraft tyre, give the tyre a greatly improved performance in terms of touch wear, during landing.

On the basis of these results, it is estimated that a tyre according to the invention, compared to the reference tyre, allows an overall gain in wear life over the entire cycle of use of the tyre comprising the landing, taxiing and braking phases.

This gain in wear life of the tyre according to the invention, obtained by virtue of a more regular wearing of the tread, also presents an advantage in terms of retreading the tyre, that is to say replacing the worn tread of the tyre at the end of life.

For a tyre of the prior art at the end of life, for which the tread has a wear differential between the middle portion and the lateral portions, the retreading operation commonly requires, aside from the removal of the worn tread, the removal of the radially outermost crown layer, generally consisting of metal reinforcers and referred to as protective layer, said protective layer often being damaged at the end of life of the tyre due to its proximity to the tread.

For a tyre according to the invention, due to a more regular wearing over the axial width of the tread, removal of the protective layer is no longer necessary due to its integrity at the end of life of the tyre, which gives rise to an economic gain in the retreading operation.

The invention claimed is:

1. An aircraft tire comprising a tread having an axial width L, the tread comprising:
a middle portion having an axial width $L_C$ at least equal to 50% and at most equal to 80% of the axial width L of the tread and consisting of a middle rubber composition; and
two lateral portions positioned axially on either side of the middle portion, each having an axial width ($L_{S1}$, $L_{S2}$) at least equal to 10% and at most equal to 25% of the axial width L of the tread and each consisting of a lateral rubber composition,
wherein the middle rubber composition comprises at least one elastomeric matrix, a reinforcing filler and a cross-linking system, the elastomeric matrix comprising from 25 to 85 parts by weight per hundred parts by weight of elastomer, phr, of a tin-functionalized butadiene and styrene copolymer and from 15 to 75 phr of isoprene elastomer, a total content of isoprene elastomer and of butadiene and of tin-functionalized butadiene and styrene copolymer in the middle rubber composition being within a range extending from 45 to 100 phr,
wherein at least one lateral rubber composition is different from the middle rubber composition,
wherein the at least one lateral rubber composition comprises at least one diene elastomer, a reinforcing filler and a crosslinking system, in which the diene elastomer predominantly comprises at least one isoprene elastomer, and
wherein the at least one lateral rubber composition comprises more than 85 phr of the at least one isoprene elastomer.

2. The aircraft tire according to claim 1, wherein the content of the isoprene elastomer in the middle rubber composition is within a range extending from 20 to 65 phr.

3. The aircraft tire according to claim 1, wherein the content of tin-functionalized butadiene and styrene polymer in the middle rubber composition is within a range extending from 35 to 80 phr.

4. The aircraft tire according to claim 1, wherein the elastomeric matrix of the middle rubber composition comprises more than 0 to 55 phr of another diene elastomer.

5. The aircraft tire according to claim 4, wherein the other diene elastomer is selected from the group consisting of non-tin-functionalized butadiene and styrene copolymers, polybutadienes, and mixtures thereof.

6. The aircraft tire according to claim 1, wherein the reinforcing filler of the middle rubber composition comprises carbon black, a reinforcing inorganic filler, or both carbon black and a reinforcing inorganic filler.

7. The aircraft tire according to claim 1, wherein the content of reinforcing filler in the middle rubber composition is within a range extending from 20 to 100 phr.

8. The aircraft tire according to claim 1, wherein the middle rubber composition also comprises from 1 to 30 phr of at least one hydrocarbon-based resin predominantly composed of units derived from aromatic and cycloaliphatic monomers.

9. The aircraft tire according to claim 8, wherein the hydrocarbon-based resin predominantly composed of units derived from aromatic and cycloaliphatic monomers is such that the cycloaliphatic monomers are selected from the group consisting of cyclopentadiene, dicyclopentadiene and mixtures thereof, and the aromatic monomers are selected from the group consisting of styrene, alpha-methylstyrene, vinyltoluene, indene and mixtures thereof.

10. The aircraft tire according to claim 8, wherein the hydrocarbon-based resin predominantly composed of units derived from aromatic and cycloaliphatic monomers has an aromatic proton content of between 0 and 12%, an ethylenic proton content greater than 3%, a number-average molecular weight greater than 500 g/mol and a polydispersity index greater than 2.

11. The aircraft tire according to claim 1, wherein the lateral portion composition of each of the two lateral portions, positioned axially on either side of the middle portion, are different from the middle rubber composition.

12. The aircraft tire according to claim 1, wherein the two lateral portions, positioned axially on either side of the middle portion, are formed by identical lateral rubber compositions.

13. The aircraft tire according to claim 1, wherein the two lateral portions, positioned axially on either side of the middle portion, have identical axial widths ($L_{S1}$, $L_{S2}$).

14. An aircraft tire comprising a tread having an axial width L, the tread comprising:
- a middle portion having an axial width $L_C$ at least equal to 50% and at most equal to 80% of the axial width L of the tread and consisting of a middle rubber composition; and
- two lateral portions positioned axially on either side of the middle portion, each having an axial width ($L_{S1}$, $L_{S2}$) at least equal to 10% and at most equal to 25% of the axial width L of the tread and each consisting of a lateral rubber composition, wherein the middle rubber composition comprises at least one elastomeric matrix, a reinforcing filler and a crosslinking system, the elastomeric matrix comprising from 25 to 85 parts by weight per hundred parts by weight of elastomer, phr, of a tin-functionalized butadiene and styrene copolymer and from 15 to 75 phr of isoprene elastomer, a total content of isoprene elastomer and of butadiene and of tin-functionalized butadiene and styrene copolymer in the middle rubber composition being within a range extending from 45 to 100 phr, wherein at least one lateral rubber composition is different from the middle rubber composition, wherein the middle rubber composition also comprises from 1 to 30 phr of at least one hydrocarbon-based resin predominantly composed of units derived from aromatic and cycloaliphatic monomers, and wherein the hydrocarbon-based resin predominantly composed of units derived from aromatic and cycloaliphatic monomers has an aromatic proton content of between 0 and 12%, an ethylenic proton content greater than 3%, a number-average molecular weight greater than 500 g/mol and a polydispersity index greater than 2.

\* \* \* \* \*